US008448764B2

(12) United States Patent
Akiyoshi et al.

(10) Patent No.: US 8,448,764 B2
(45) Date of Patent: *May 28, 2013

(54) ROTATION TRANSMISSION DEVICE

(75) Inventors: Koji Akiyoshi, Iwata (JP); Takanobu Sato, Iwata (JP); Takahide Saito, Iwata (JP)

(73) Assignee: NTN Corporation, Osaka (JP)

( * ) Notice: Subject to any disclaimer, the term of this patent is extended or adjusted under 35 U.S.C. 154(b) by 351 days.

This patent is subject to a terminal disclaimer.

(21) Appl. No.: 12/742,448

(22) PCT Filed: Dec. 9, 2008

(86) PCT No.: PCT/JP2008/072301
§ 371 (c)(1),
(2), (4) Date: May 12, 2010

(87) PCT Pub. No.: WO2009/075256
PCT Pub. Date: Jun. 18, 2009

(65) Prior Publication Data
US 2010/0314212 A1 Dec. 16, 2010

(30) Foreign Application Priority Data

Dec. 12, 2007 (JP) ................. 2007 320841
Dec. 17, 2007 (JP) ................. 2007 324931
Dec. 25, 2007 (JP) ................. 2007-331814
Feb. 14, 2008 (JP) ................. 2008-033358

(51) Int. Cl.
*F16D 41/08* (2006.01)
(52) U.S. Cl.
USPC ............................ 192/35; 192/40; 192/84.8
(58) Field of Classification Search
USPC ............................ 192/66.1, 84.31
See application file for complete search history.

(56) References Cited

U.S. PATENT DOCUMENTS 1,726,329 A * 8/1929 Aiken ..................... 192/47
4,496,922 A * 1/1985 Pardee ................... 335/281
(Continued)

FOREIGN PATENT DOCUMENTS

JP 2000-104754 4/2000
JP 2003-262238 9/2003
(Continued)

OTHER PUBLICATIONS

Machine translation of Japanese reference JP2006029445A.*

(Continued)

*Primary Examiner* — David D Le
*Assistant Examiner* — Mark Manley
(74) *Attorney, Agent, or Firm* — Wenderoth, Lind & Ponack, L.L.P.

(57) ABSTRACT

A rotation transmission device includes an outer ring having an inner periphery and an inner ring mounted inside the outer ring and having an outer periphery. A control retainer and a rotary retainer are disposed between opposed surfaces of the outer ring and the inner ring, and each of the retainers has a flange and bridges provided at the radially outer side of the respective flange and arranged circumferentially alternately with the bridges of the other retainer thereby defining pockets between the adjacent bridges. The control retainer is axially slidably and rotatably supported and the rotary retainer is axially immovably and rotatably supported. An electromagnetic clutch is mounted on a torque transmission shaft and includes an electromagnet having an electromagnetic coil, the electromagnetic clutch being configured to axially move the control retainer when the electromagnetic coil is energized and deenergized.

14 Claims, 13 Drawing Sheets

U.S. PATENT DOCUMENTS

| | | | |
|---|---|---|---|
| 6,598,288 B1 * | 7/2003 | Takehara | 29/598 |
| 6,955,251 B2 * | 10/2005 | Kurita et al. | 192/19 |
| 7,063,194 B2 * | 6/2006 | Hori et al. | 192/35 |
| 7,117,710 B2 * | 10/2006 | Kurita et al. | 72/379.2 |
| 7,604,105 B2 * | 10/2009 | Sato et al. | 192/35 |
| 2005/0094912 A1 * | 5/2005 | Ouchi | 384/544 |

FOREIGN PATENT DOCUMENTS

| | | |
|---|---|---|
| JP | 2004-245280 | 9/2004 |
| JP | 2005-042898 | 2/2005 |
| JP | 2005-249003 | 9/2005 |
| JP | 2006029445 A * | 2/2006 |
| JP | 2006-170416 | 6/2006 |

OTHER PUBLICATIONS

International Search Report issued Jan. 27, 2009 in International (PCT) Application No. PCT/JP2008/072301.

* cited by examiner

Fig.2
(I)
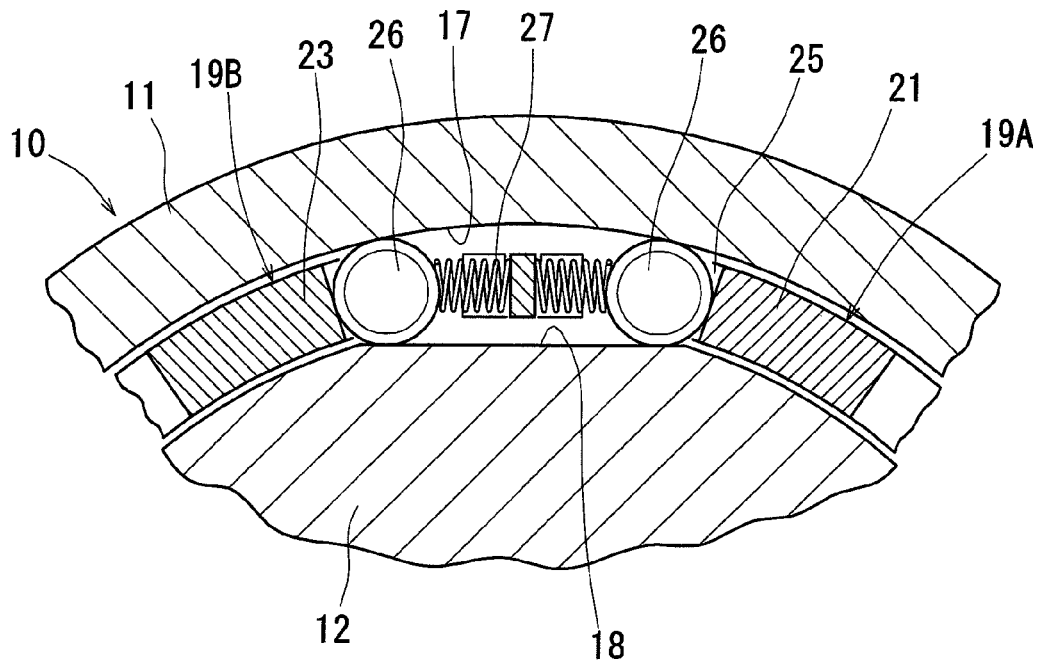
(II)
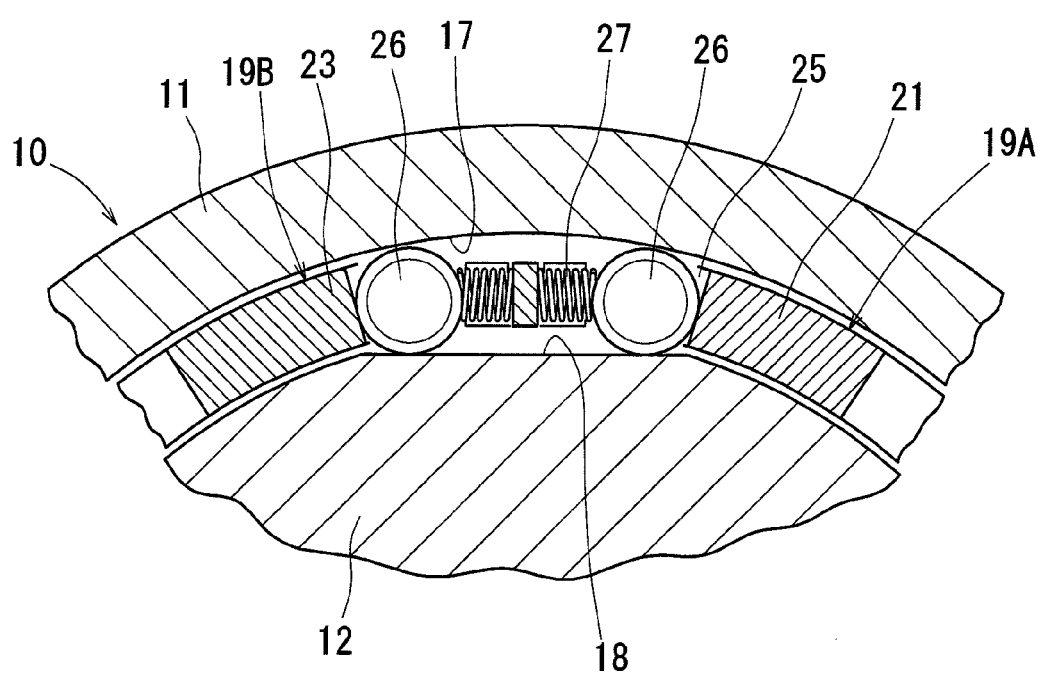

Fig.5
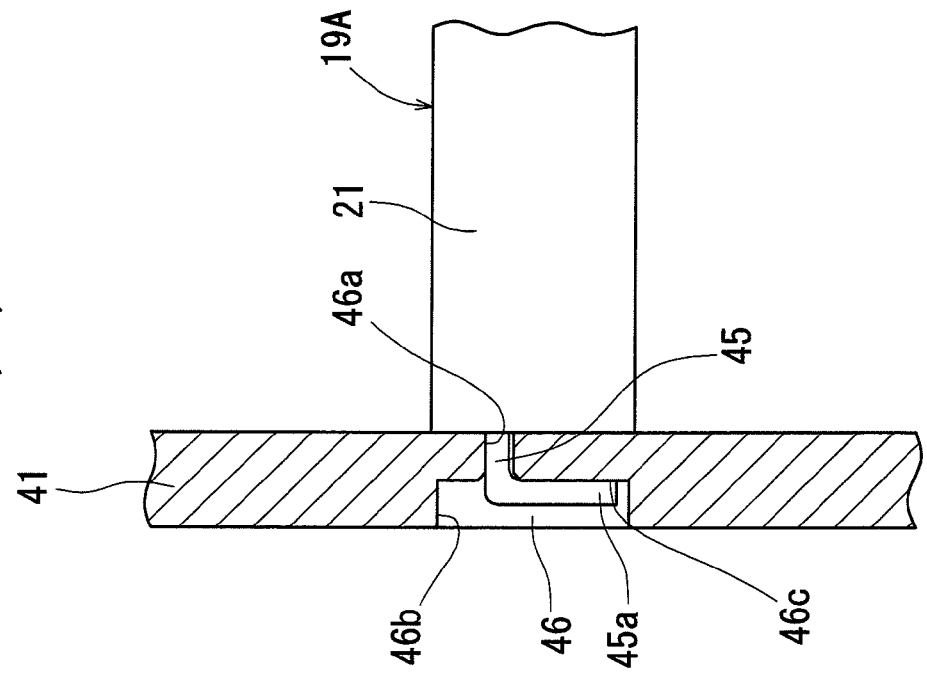
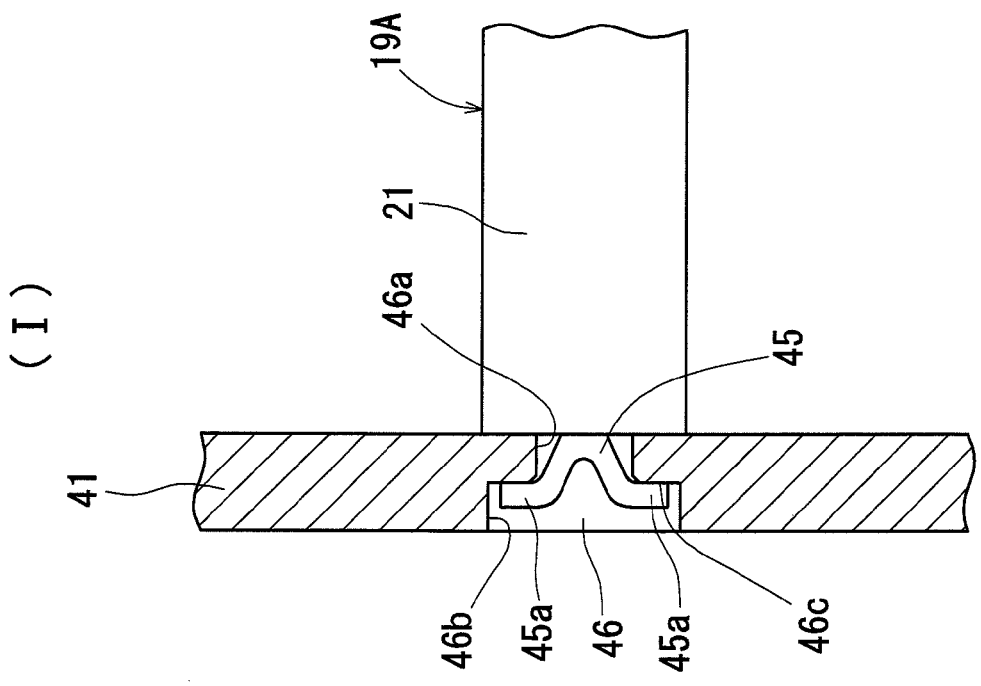

Fig.6
(I)
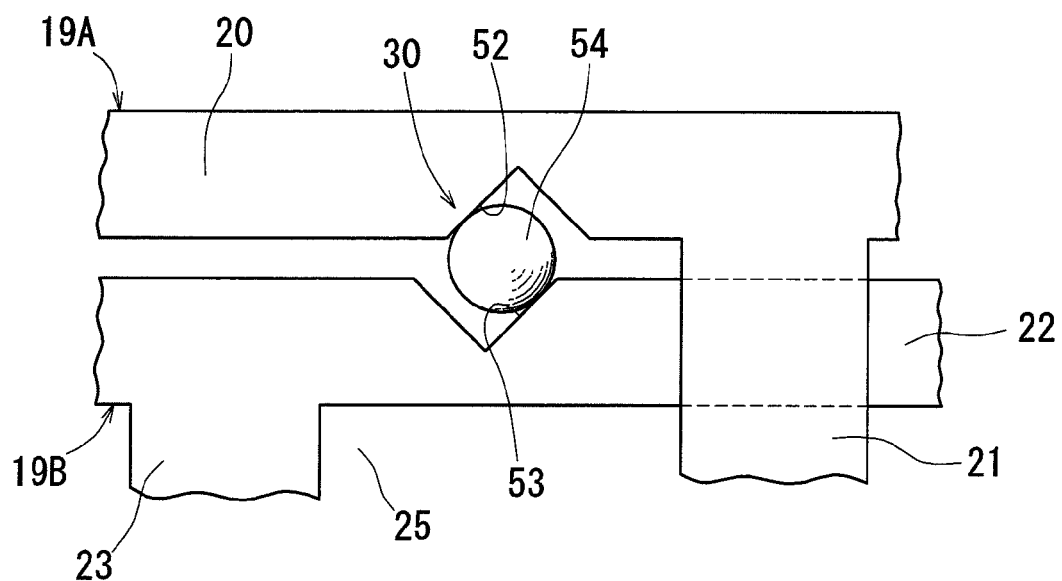
(II)
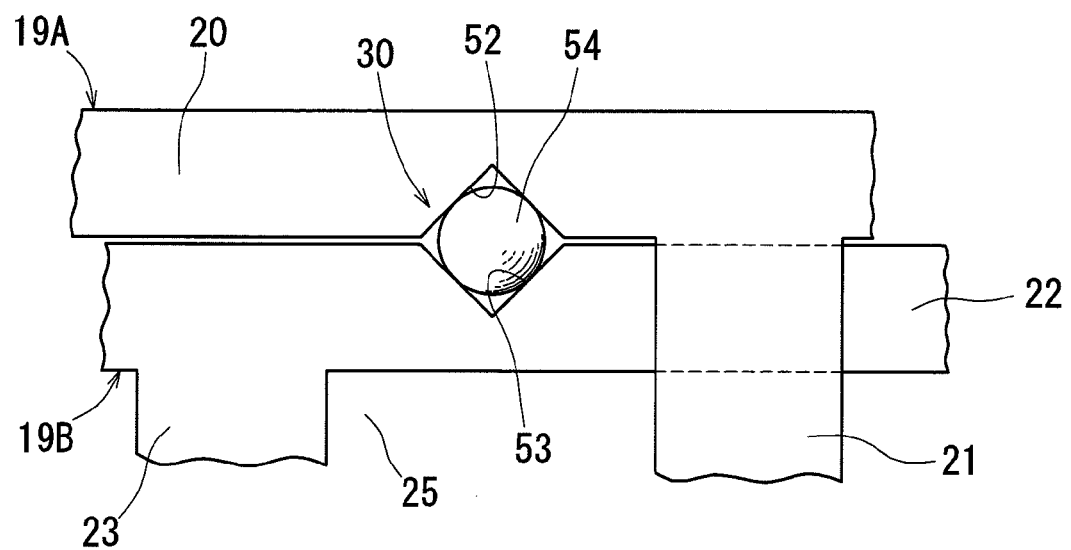

Fig. 11
(I)
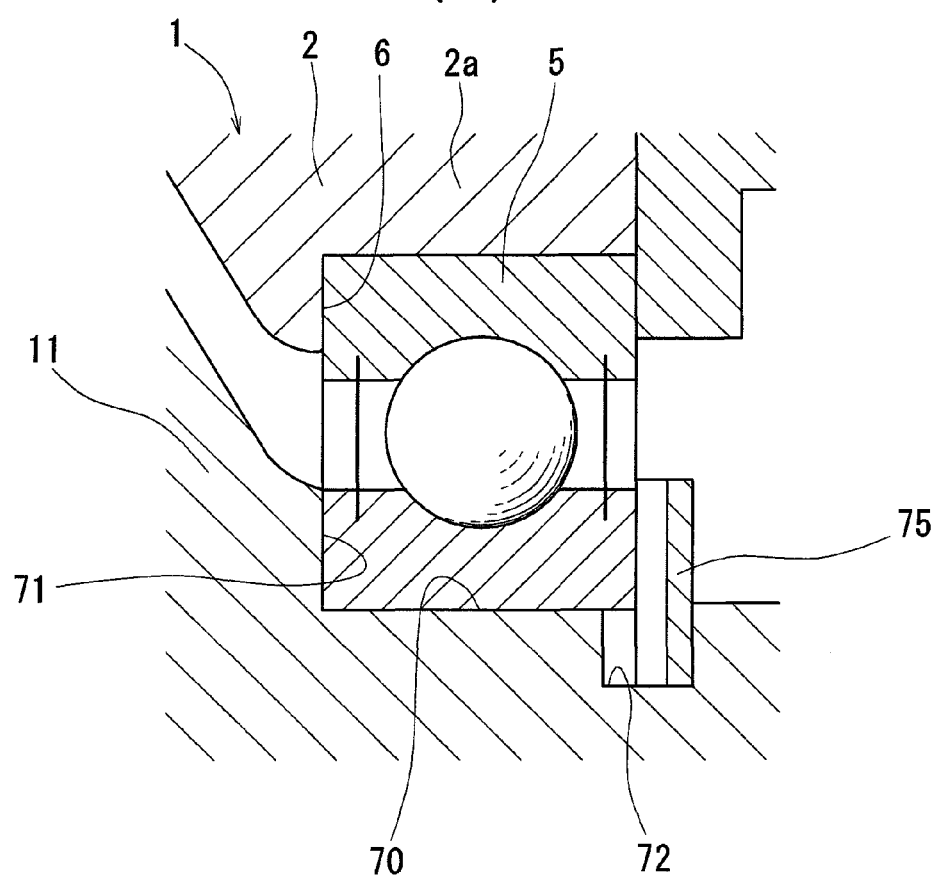
(II)
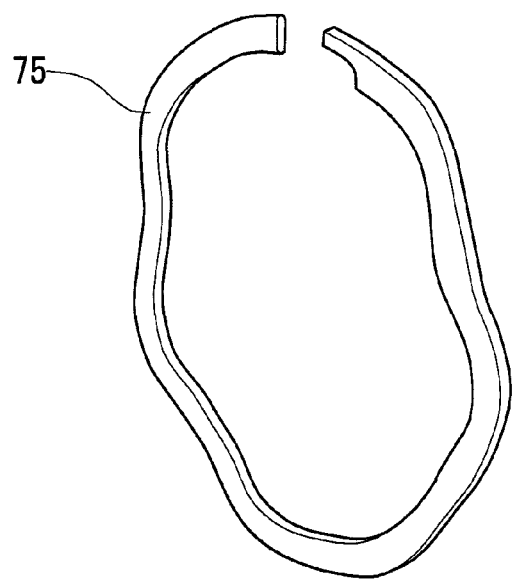

ROTATION TRANSMISSION DEVICE

TECHNICAL FIELD

This invention relates to a rotation transmission device used to selectively transmit power.

BACKGROUND ART

JP Patent Publication 2005-249003A discloses a rotation transmission device used in an FR-based four-wheel drive vehicle for selectively transmitting driving force to the front wheels as auxiliary drive wheels.

The rotation transmission device disclosed in JP Patent Publication 2005-249003A includes a two-way clutch disposed between a large-diameter portion of an input member and an outer ring provided therearound, and an electromagnetic clutch provided beside the two-way clutch for selectively engaging and disengaging the two-way clutch, whereby when the two-way clutch is engaged, the input member is coupled to the outer ring, so that torque is transmitted between the input member and the outer ring.

The outer ring of the two-way clutch has a cylindrical surface on its inner periphery, while cam surfaces are formed on the outer periphery of the large-diameter portion of the input member to define wedge-shaped spaces that narrow toward their circumferential ends between the cylindrical surface and the respective cam surfaces. The two-way clutch further includes engaging elements in the form of rollers mounted between the respective cam surfaces and the cylindrical surface, and a retainer retaining the engaging elements. When the retainer and the input member rotate relative to each other, the engaging elements are adapted to engage the cylindrical surface and the cam surfaces. The two-way clutch further includes a switch spring mounted between the input member and the retainer that biases the retainer to keep the engaging elements in neutral positions where the engaging elements are disengaged from the cylindrical surface and the cam surfaces.

The electromagnetic clutch comprises an armature rotatably fixed to the retainer so as to be axially movable, a rotor connected to the outer ring and axially facing the armature, an electromagnet axially facing the rotor, and a separation spring biasing the armature away from the rotor, whereby when the electromagnet is energized, the armature is attracted to the rotor, and the engaging elements engage the cylindrical surface and the cam surfaces due to rotation of the armature, which is now coupled to the outer ring, relative to the inner member.

With this two-way clutch, because the rollers are moved from the wide portions of the respective wedge-shaped spaces to one of the narrow ends of each wedge-shaped space when the input member and the retainer rotate relative to each other, play in the rotational direction is large.

Also, when changing the direction in which torque is transmitted between the outer ring and the input member, it is necessary to rotate the retainer until each roller wedges into the opposite narrow end of the wedge-shaped space. Thus, it is impossible to quickly change the rotational direction.

To avoid this problem, JP Patent Publication 2003-262238A proposes to arrange the rollers at unequal intervals such that one and the other of each adjacent pair of rollers are located at one and the other ends of the wedge-shaped spaces.

DISCLOSURE OF THE INVENTION

Object of the Invention

With the two-way roller clutch disclosed in Patent Document 2, while it is possible to reduce play in the rotational direction, it is impossible to completely eliminate such play in the rotational direction. Also, since the gaps between the rollers and the outer ring cylindrical surface and between the rollers and the inner ring cam surfaces are small, the rollers tend to get engaged in error while the two-way clutch is idling. Thus, the two-way clutch cannot be idled with high reliability.

Also, while torque is being transmitted between the outer ring and the inner ring, since only half the rollers are engaged while the remaining half of the rollers are disengaged, the torque capacity is low.

An object of the present invention is to provide a rotation transmission device which is small in play in the rotational direction, can be idled with high reliability and is high in torque capacity.

Means to Achieve the Object

In order to achieve this object, the first invention provides a rotation transmission device comprising an outer ring having an inner periphery, an inner ring mounted inside the outer ring and having an outer periphery, wherein a cylindrical surface is formed on one of the inner periphery of the outer ring and the outer periphery of the inner ring, and a plurality of circumferentially spaced cam surfaces are formed on the other of the inner periphery of the outer ring and the outer periphery of the inner ring to define a wedge-shaped space which narrows toward its circumferential ends between the cylindrical surface and each cam surface, a control retainer and a rotary retainer disposed between opposed surfaces of the outer ring and the inner ring, each of the retainers having a flange axially facing the flange of the other retainer, and bridges provided at the radially outer side of the flange and arranged circumferentially alternately with the bridges of the other retainer, thereby defining pockets between the adjacent bridges so as to face the respective cam surfaces, wherein the control retainer is slidably and rotatably supported and the rotary retainer is axially immovably and rotatably supported, a torque cam provided between the flanges of the control retainer and the rotary retainer for causing the retainers to rotate relative to each other in a direction to reduce the circumferential width of the pockets when the control retainer is moved in a direction to reduce the distance between the flanges of the respective retainers, a plurality of opposed pairs of rollers, each pair being received in one of the pockets, and coil springs each received in one of the pockets and biasing the pair of rollers away from each other, a disk-shaped spring holder fixed to one side of the inner ring and having on its outer periphery a plurality of anti-rotation pieces adapted to support the respective bridges of the retainers, thereby keeping the opposed pairs of rollers in neutral positions, when the control retainer and the rotary retainer rotate relative to each other in the direction to reduce the circumferential width of the pockets, a torque transmission shaft having one end portion thereof inserted in and coupled to the inner ring by means of a spline, and an electromagnetic clutch mounted on the torque transmission shaft and including an electromagnet having an electromagnetic coil, the electromagnetic clutch being configured to axially move the control retainer when the electromagnetic coil is energized and deenergized.

With this rotation transmission device, when the electromagnetic clutch is activated and the control retainer is moved in the direction in which its flange moves toward the flange of the rotary retainer, the torque cam is activated such that the control retainer and the rotary retainer rotate relative to each other to increase the circumferential width of the pockets. Thus, the opposed pairs of rollers are pushed by the bridges of the control retainer and the bridges of the rotary retainer toward each other, and disengage.

In this state, rotation of the inner ring is not transmitted to the outer ring, and the inner ring idles.

With the inner ring idling, when the electromagnetic clutch is activated and the control retainer is moved in the direction in which its flange moves away from the flange of the rotary retainer, the control retainer and the rotary retainer rotate relative to each other in the direction to increase the circumferential width of the pockets under the biasing force of the coil springs. This causes the opposed pairs of rollers to be instantly wedged into the narrow ends of the wedge-shaped spaces, so that torque in one direction can be transmitted between the inner ring and the outer ring through one of each opposed pair of rollers, while torque in the opposite direction can be transmitted through the other of each opposed pair of rollers.

The torque cam for rotating the control retainer and the rotary retainer relative to each other when the control retainer moves in the axial direction may comprise a pair of protrusions provided on respective opposed surfaces of the flanges of the control retainer and the rotary retainer, the protrusions having inclined cam surfaces that are opposed to and in contact with each other, respectively.

Also, the torque cam may comprise a pair of cam grooves formed in respective opposed surfaces of the flanges of the control retainer and the rotary retainer so as to gradually shallow from their circumferential centers toward circumferential ends thereof, each of the cam grooves having first and second end portions, and a ball disposed between the first end portion of one of the cam grooves, and a second end portion of the other of the cam grooves. With this arrangement, since the control retainer and the rotary retainer can be rotated relative to each other by rolling the ball, compared to the arrangement in which the control retainer and the rotary retainer are rotated relative to each other with the inclined cam surfaces in contact with each other, the control retainer can be moved with less resistance, and the control retainer and the rotary retainer can be more smoothly rotated relative to each other.

The electromagnetic clutch for axially moving the control retainer may further comprise an armature coupled to the bridges of the control retainer and slidable axially of the torque transmission shaft, a rotor fixed to the torque transmission shaft and axially facing the armature, the electromagnet being supported on a stationary member so as to axially face the rotor, and configured to attract the armature against the rotor when the electromagnet is energized, and a separation spring biasing the armature away from the rotor, whereby the armature separates from the rotor when the electromagnet is deenergized. With this arrangement, by energizing the electromagnet, the control retainer can be moved in the direction in which its flange moves toward the flange of the rotary retainer, and by deenergizing the electromagnet, the control retainer can be moved in the direction in which its flange moves away from the flange of the rotary retainer under the biasing force of the separation spring.

Alternatively, the electromagnetic clutch may further comprise an armature coupled to the bridges of the control retainer and slidable axially of the torque transmission shaft, a rotor fixed to the torque transmission shaft and axially facing the armature, a separation spring biasing the armature away from the rotor, and a permanent magnet attracting the armature toward and against the rotor against the force of the separation spring, the electromagnet being supported on a stationary member so as to axially face the rotor, and configured to reduce the magnetic force of the permanent magnet lower than the force of the separation spring when the electromagnet is energized. With this arrangement, by energizing the electromagnet, the control retainer can be moved in the direction in which its flange moves away from the flange of the rotary retainer, and by deenergizing the electromagnet, the control retainer can be moved in the direction in which its flange moves toward the flange of the rotary retainer.

When either of the above types of electromagnetic clutches is used, the bridges of the control retainer may be coupled to the armature by caulking. With this arrangement, it is possible to form the control retainer and the armature separately from each other with high accuracy, and to couple them together at a low cost. Thus, it is possible to reduce the cost of the entire rotation transmission device.

With the rotation transmission device according to the first invention, the spline may comprise a spline groove formed in the inner periphery of the inner ring, and a spline tooth formed on the outer periphery of the torque transmission shaft at the one end portion thereof and engaged in the spline groove. In this case, at least one of the spline groove and the spline tooth preferably has a twist angle so as to reduce play in the rotational direction at the portion where the inner ring is fitted on the torque transmission shaft.

In order to achieve the above object, the second invention provides a rotation transmission device comprising an outer ring having an inner periphery, an inner ring mounted inside the outer ring and having an outer periphery, wherein a cylindrical surface is formed on one of the inner periphery of the outer ring and the outer periphery of the inner ring, and a plurality of circumferentially spaced cam surfaces are formed on the other of the inner periphery of the outer ring and the outer periphery of the inner ring to define a wedge-shaped space which narrows toward its circumferential ends between the cylindrical surface and each cam surface, a cylindrical retainer mounted between the outer ring and the inner ring, and having radially inwardly extending flanges at both ends thereof, and bridges defining pockets between the adjacent bridges so as to face the respective cam surfaces, a plurality of opposed pairs of rollers, each pair being received in one of the pockets, and coil springs each received in one of the pockets and biasing the pair of rollers away from each other, wherein each of the bridges comprises first and second separate bridge portions, and wherein the retainer comprises an axially movable and rotatable control retainer including the first bridge portions and an axially immovable and rotatable rotary retainer including the second bridge portions, the first and second bridge portions of each bridge having inclined cam surfaces axially in abutment with each other, the inclined cam surfaces being configured to rotate the control retainer and the rotary retainer relative to each other in a direction to reduce the circumferential width of the pockets when the control retainer moves toward the rotary retainer, an annular spring holder fixed to one side of the inner ring and having on its outer periphery a plurality of anti-rotation pieces received in the respective pockets and adapted to support the bridge portions of the control retainer and the rotary retainer, thereby keeping the opposed pairs of rollers in neutral positions, when the control retainer and the rotary retainer rotate relative to each other in the direction to reduce the circumferential width of the pockets, a torque transmission shaft having one end portion thereof inserted in and coupled to the inner ring by means of a spline, and an electromagnetic clutch mounted on the torque transmission shaft and including an electromagnet having an electromagnetic coil, the electromagnetic clutch being configured to axially move the control retainer when the electromagnetic coil is energized and deenergized.

According to the second invention, when the control retainer is moved away from the rotary retainer by activating the electromagnetic clutch, gaps form between the inclined cam surfaces formed on the bridge portions of the control retainer and the inclined cam surfaces formed on the bridge portions of the rotary retainer. Thus, the bridge portions of the control retainer and the bridge portions of the rotary retainer are pushed away from each other by the coil springs through the opposed pairs of rollers. This causes the control retainer and the rotary retainer to rotate relative to each other in the direction to increase the circumferential width of the pockets, thus allowing the opposed pairs of rollers to be wedged into the respective narrow ends of the wedge-shaped spaces. In this state, torque in one direction is transmitted through one of each opposed pair of rollers, while torque in the opposite direction is transmitted through the other of each pair of rollers.

While torque is being transmitted between the outer ring and the inner ring, when the control retainer is moved toward the rotary retainer by activating the electromagnetic clutch, the control retainer and the rotary retainer rotate relative to each other in the direction to increase the circumferential width of the pockets due to the camming action between the inclined cam surfaces of the bridges that are in abutment with each other. As a result, the opposed pairs of rollers are pushed toward each other by the bridge portions of the control retainer and the bridge portions of the rotary retainer, and disengage. Transmission of torque between the outer ring and the inner ring thus stops.

In the second invention, the anti-rotation pieces provided on the outer periphery of the spring holder may each have a support piece extending in a direction transverse to the coil springs to prevent the coil springs from moving radially outwardly. With this arrangement, it is possible to prevent the coil springs from radially outwardly separating from between the opposed pairs of rollers, which in turn makes it possible to reliably engage and disengage the opposed pairs of rollers.

As a final product, the rotation transmission device according to either the first or second invention further comprises a cylindrical housing in which the outer ring and the electromagnetic clutch are mounted, and a bearing mounted in the housing at one end thereof to rotatably support the outer ring, wherein the electromagnet of the electromagnetic clutch is supported by the housing.

In this case, preferably, the outer ring has a bearing fitting surface fitted in a radially inner surface of the bearing, and a positioning surface kept in abutment with an inner side surface of the bearing, thereby axially positioning the outer ring, and a biasing means is provided to bias the outer ring in a direction in which the positioning surface is pressed against the inner side surface of the bearing. With this arrangement, the outer ring can be mounted with no axial play, so that it is possible to reliably operate the two-way roller clutch.

Advantages of the Invention

According to the first invention, when the electromagnetic clutch is activated and the control retainer is moved in the direction in which its flange moves away from the flange of the rotary retainer, the control retainer and the rotary retainer rotate relative to each other in the direction to increase the circumferential width of the pockets under the biasing force of the coil springs. This causes the opposed pairs of rollers to be instantly wedged into the narrow ends of the wedge-shaped spaces. Thus, it is possible to minimize play in the rotational direction in the rotation transmission device.

When the control retainer is moved in the direction in which its flange moves toward the flange of the rotary retainer, the torque cam is activated such that the control retainer and the rotary retainer rotate relative to each other to increase the circumferential width of the pockets. Thus, the opposed pairs of rollers are pushed by the bridges of the control retainer and the rotary retainer, and disengage. In this disengaged state, the bridges of the control retainer and the rotary retainer prevent the opposed pairs of rollers from being pushed into the narrow ends of the wedge-shaped spaces, which in turn prevents the rollers from getting engaged in error while the two-way roller clutch is idling. This ensures reliable idling of the two-way roller clutch.

Since turning torque is transmitted from the inner ring to the outer ring through as many rollers as the cam surfaces, the rotation transmission device has a large torque capacity.

According to the second invention, when the control retainer is moved away from the rotary retainer, the control retainer and the rotary retainer rotate relative to each other in the direction to increase the circumferential width of the pockets under the biasing force of the coil springs. This causes the opposed pairs of rollers to be instantly wedged into the narrow ends of the wedge-shaped spaces. Thus, as in the first invention, it is possible to minimize play in the rotational direction in the rotation transmission device.

When the control retainer is moved toward the rotary retainer, the opposed pairs of rollers are pushed by the bridge portions of the control retainer and the rotary retainer, and disengage. In this disengaged state, the bridge portions of the control retainer and the rotary retainer prevent the opposed pairs of rollers from being pushed into the narrow ends of the wedge-shaped spaces, which in turn prevents the rollers from getting engaged in error while the two-way roller clutch is idling. This ensures reliable idling of the two-way roller clutch.

BRIEF DESCRIPTION OF THE DRAWINGS

FIG. 2(I) is a sectional view taken along line II-II of FIG. 1; and FIG. 2(II) is a similar sectional view showing the state in which the rollers are disengaged.

FIG. 5(I) is an enlarged sectional view of a portion where the armature is coupled to the control retainer by caulking; and FIG. 5(II) shows another example of coupling the armature to the control retainer by caulking.

FIGS. 6(I) and 6(II) are sectional views of a different torque cam before and during operation, respectively.

FIG. 11(I) is a sectional view of a different outer ring supporting structure; and FIG. 11(II) is a perspective view of a wavy snap ring.

FIG. 12(I) is a sectional view of a still different outer ring supporting structure.

DESCRIPTION OF THE NUMERALS

Figure 1:
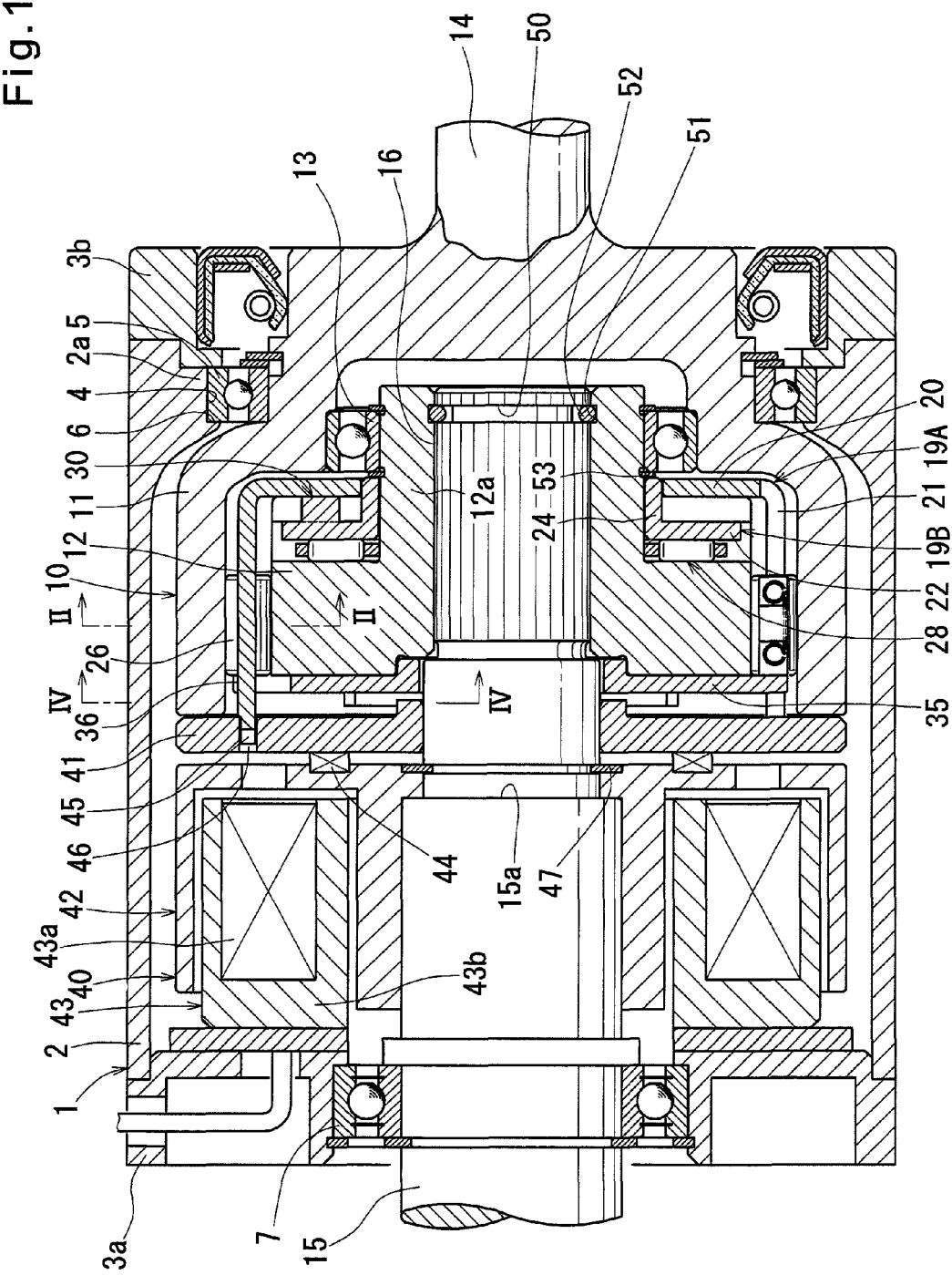
FIG. 1 is a vertical sectional front view of a rotation transmission device according to a first embodiment of the present invention.

1. Housing
5. Bearing
11. Outer ring
12. Inner ring
15. Input shaft (Torque transmission shaft)
16. Spline
16a. Spline tooth
16b. Spline groove
17. Cylindrical surface
18. Cam surface
19A. Control retainer
19B. Rotary retainer
20, 22. Flange
21, 23. Bridge
25. Pocket
26. Roller
27. Coil spring
30. Torque cam
31, 32. Protrusion
33, 34. Inclined cam surface
35. Spring holder
36. Anti-rotation piece
40. Electromagnetic clutch
41. Armature
42. Rotor
43. Electromagnet
43a. Electromagnetic coil
44. Separation spring
52, 53. Cam groove
54. Ball
62. Permanent magnet
70. Bearing fitting surface
71. Positioning surface
72. Engaging groove
74. Wavy washer (Biasing means)
75. Wavy snap ring (Biasing means)
76. Snap ring (Biasing means)
80. Retainer
80A. Control retainer
80B. Rotary retainer
80a, 80b. Flange
81. Pocket
82. Bridge
82a, 82b. Bridge portion
84a, 84b. Inclined cam surface
85. Spring holder
86. Anti-rotation piece
87. Support piece

BEST MODE FOR EMBODYING THE INVENTION

Now the embodiments of the present invention are described with reference to the drawings. FIG. 1 shows the first embodiment of the present invention. As shown, the first embodiment includes a housing 1, which is a stationary member and comprises a cylindrical member 2 and a pair of lid members 3a and 3b fitted in the respective openings of the cylindrical member 2 at both ends thereof. The cylindrical member 2 has a thick-walled portion 2a at one end thereof. The thick-walled portion 2a has on its inner periphery a bearing fitting surface 4 and a positioning shoulder 6 for axially positioning a bearing 5 press-fitted into the bearing fitting surface 4.

In the housing 1 are mounted a two-way roller clutch 10 and an electromagnetic clutch 40 for selectively engaging and disengaging the two-way roller clutch 10.

The two-way roller clutch 10 includes an outer ring 11 and an inner ring 12 mounted in the outer ring 11. The outer ring 11 is rotatably supported by the bearing 5, which is mounted in the housing 1 at one end thereof.

The inner ring 12 has a small-diameter cylindrical portion 12a at one end thereof. The outer ring 11 and the inner ring 12 are rotatable relative to each other through a bearing 13 fitted on the radially outer surface of the small-diameter cylindrical portion 12a.

The outer ring 11 carries an output shaft 14 at its closed end. An input shaft 15 as a torque transmission shaft has its end fitted in the inner ring 12. Splines 16 are formed on the portions of the input shaft 15 and the inner ring 12 where the input shaft 15 is fitted in the inner ring 12, thereby rotationally fixing the input shaft 15 and the inner ring 12 to each other. A snap ring 52 is received both in an engaging groove 50 formed in the input shaft 15 at its end and in a ring groove 51 formed in the radially inner surface of the inner ring 12, thereby preventing separation of the input shaft 15 and the inner ring 12 from each other.

The input shaft 15 extends through the lid member 3a of the housing 1, and rotatably supported by a bearing 7 mounted at the portion where the shaft 15 extends through the lid member 3a.

As shown in FIG. 2, the outer ring 11 has a cylindrical surface 17 on its inner periphery. The inner ring 12 has on its outer periphery a plurality of equiangularly spaced flat cam surfaces 18 defining wedge spaces narrowing toward both circumferential ends thereof, in cooperation with the cylindrical surface 17.

Figure 3:
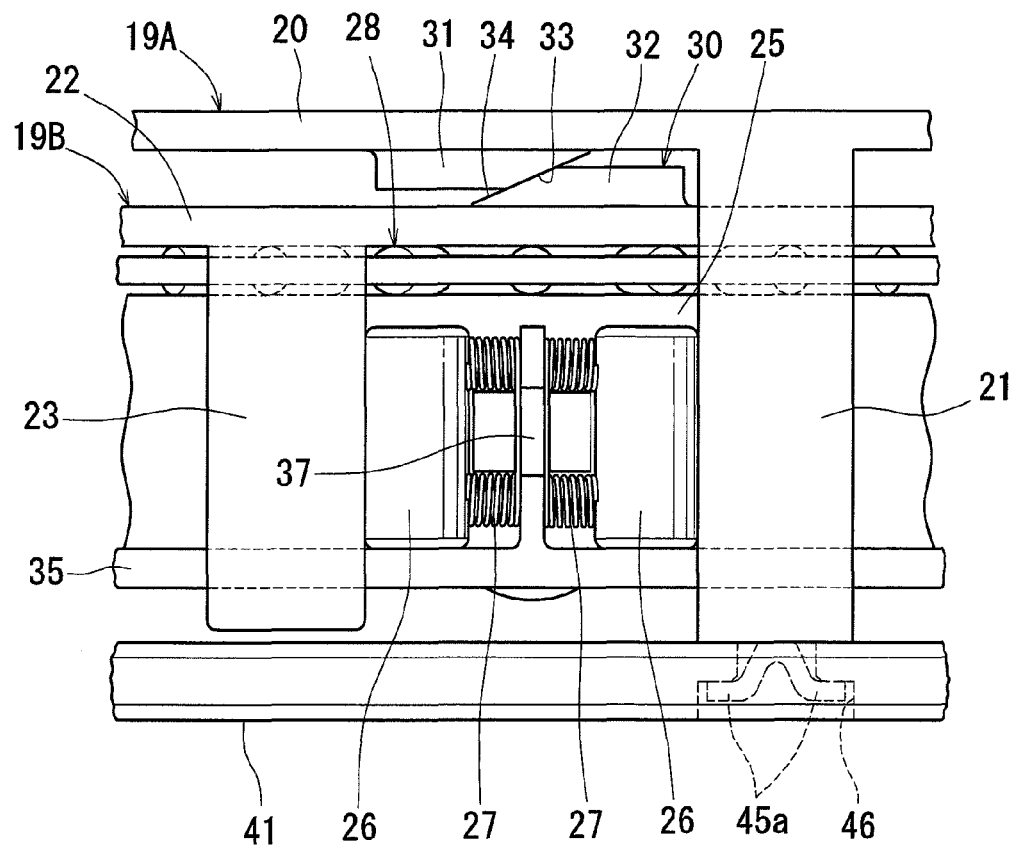
FIG. 3 is a plan view of a portion of the retainer of the two-way roller clutch.

Between the outer ring 11 and the inner ring 12, a control retainer 19A and a rotary retainer 19B are mounted. As shown in FIGS. 1 and 3, the control retainer 19A has as many equiangularly spaced bridges 21 as the cam surfaces 18 that extend from the radially outer edge of a flange 20. The rotary retainer 19B has as many equiangularly spaced bridges 23 as the cam surfaces 18 that extend in one direction from the radially outer edge of a flange 22, and a cylindrical portion 24 extending in the opposite direction from the radially inner edge of the flange 22.

The rotary retainer 19B has its cylindrical portion 24 fitted on the small-diameter cylindrical portion 12a of the inner ring 12 with the bridges 23 located between the cylindrical surface 17 and the cam surfaces 18. The control retainer 19A has its flange 20 fitted on the cylindrical portion 24 of the rotary retainer 19B such that the flange 20 axially oppose the flange 22 of the rotary retainer 19B, with its bridges 21 located between the adjacent bridges 23 of the rotary retainer 19B.

With the retainers 19A and 19B mounted in this manner, pockets 25 are defined between the adjacent bridges 21 and 23 of the control retainer 19A and the rotary retainer 19B, respectively, as shown in FIGS. 2(1) and 3. The pockets 25 radially face the respective cam surfaces 18 of the inner ring 12. In each pocket 25, an opposed pair of rollers 26 and a coil spring 27 are mounted with the coil spring 27 biasing the rollers 26 away from each other.

As shown in FIG. 1, the rotary retainer 19B is rotatably supported by a thrust bearing mounted between one side of the inner ring 12 and the flange 22, and is prevented from axial movement by a snap ring 53 mounted to the outer periphery of the small-diameter cylindrical portion 12a.

The control retainer 19A is movable along the radially outer surface of the cylindrical portion 24 of the rotary retainer 19B and is rotatable about the cylindrical portion 24.

As shown in FIG. 3, a torque cam 30 is provided between the flange 20 of the control retainer 19A and the flange 22 of the rotary retainer 19B. The torque cam 30 comprises a circumferentially opposed pair of protrusions 31 and 32 formed on the opposed surfaces of the flange 20 of the control retainer 19A and the flange 22 of the rotary retainer 19B, respectively. The protrusions 31 and 32 have inclined cam surfaces 33 and 34, respectively, that are in contact with each other.

The torque cam 30 is configured such that when the control flange 19A moves in the axial direction in which the flange 20 of the control retainer 19A moves toward the flange 22 of the rotary retainer 19B, the control retainer 19A and the rotary retainer 19B rotate relative to each other in the direction in which the circumferential width of the pockets 25 decreases due to the camming action between the inclined cam surfaces 33 and 34.

Figure 4:
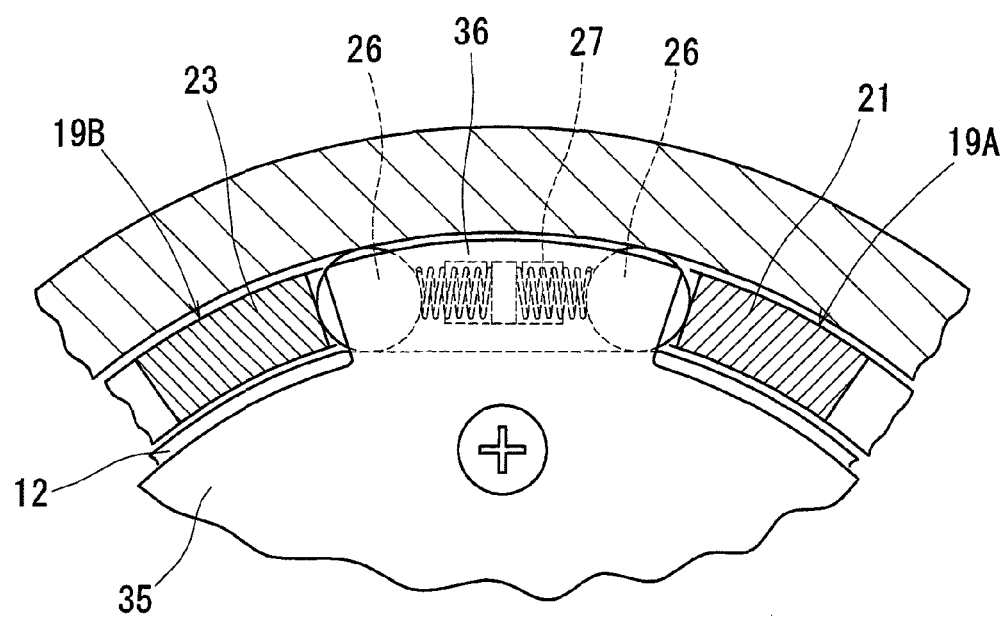
FIG. 4 is sectional view taken along line IV-IV of FIG. 1.

As shown in FIGS. 1, 3 and 4, a spring holder 35 is fixed to the other side of the inner ring 12. The spring holder 35 is an annular plate formed with a plurality of anti-rotation pieces 36 received in the respective pockets 25 defined between the bridges 21 and 23 of the control retainer 19A and the rotary retainer 19B.

When the control retainer 19A and the rotary retainer 19B rotate relative to each other in the direction in which the circumferential width of the pockets 25 decreases, the anti-rotation pieces 36 support the bridges 21 of the control retainer 19A and the bridges 23 of the rotary retainer 19B on both side edges thereof, thereby keeping the respective pairs of rollers 26 in their neutral positions.

Each anti-rotation piece 36 carries an axially extending support piece 37 supporting the coil spring 27.

As shown in FIG. 1, the electromagnetic clutch 40 comprises an armature 41 axially facing the end surfaces of the bridges 21 of the control retainer 19A, a rotor 42 axially facing the armature 41, an electromagnet 43 axially facing the rotor 42, and a separation spring 44 biasing the armature 41 away from the rotor 42.

The armature 41 is fitted on and rotatably supported by the input shaft 15. The armature 41 and bridges 21 of the control retainer 19A are fixedly coupled to each other by caulking.

In order to couple the armature 41 and the bridges 21 of the control retainer 19A, in FIG. 5(I), a projection 45 is formed at the free end of each of the bridges 21, the projection 45 is inserted through a small-diameter portion 46a of a stepped hole 46 formed in the armature 41, a pair of bent pieces 45a are provided at the free end of the projection 45 so as to be received in the large-diameter portion 46b of the stepped hole 46, and the bent pieces 45a are brought into engagement with the shoulder 46c of the stepped hole 46. In FIG. 5(II), a single bent piece 45a is provided which is brought into engagement with the shoulder 46c of the stepped hole 46.

The projection 45 is preferably made of a material softer than the material forming the armature 41 so that the projection 45 can be caulked easily without deforming the armature 41.

As shown in FIG. 1, the rotor 42 is fitted on the input shaft 15, and axially positioned and rotationally fixed to the input shaft 15 by a shoulder 15a on the outer periphery of the input shaft 15 and a snap ring 47 mounted to the outer periphery of the input shaft 15.

The electromagnet 43 comprises an electromagnetic coil 43a, and a core 43b supporting the electromagnetic coil 43a. The core 43b is supported on the stationary lid member 3a of the housing 1.

Now the operation of the rotation transmission device of the first embodiment is described. FIG. 1 shows the state in which the electromagnetic coil 43a of the electromagnet 43 is off and thus the armature 41 is separated from the rotor 42 by the separation spring 44. In this state, the two-way roller clutch 10 is engaged, with its opposed pairs of rollers 26 kept in engagement with the cylindrical surface 17 of the outer ring 11 and the cam surfaces 18 of the inner ring 12, as shown in FIG. 2(I).

With the two-way roller clutch 10 engaged, when the electromagnetic coil 43a is energized, attraction force acts on the armature 41 and axially moves the armature 41 until it is pressed against the rotor 42.

Since the armature 41 is fixedly coupled to the bridges 21 of the control retainer 19A, when the armature 41 moves axially, the control retainer 19A moves in the direction in which its flange 20 moves toward the flange 22 of the rotary retainer 19B.

When the retainer 19A moves in this direction, the inclined cam surface 33 of the protrusion 31 on the control retainer 19A presses the inclined cam surface 34 of the protrusion 32 on the rotary retainer 19B, thereby causing the control retainer 19 and the rotary retainer 19B to rotate relative to each other in the direction in which the circumferential width of the pockets 25 decreases. Thus, the bridges 21 of the control retainer 19A and the bridges 23 of the rotary retainer 19B press and disengage the respective opposed pairs of rollers 26, thereby disengaging the two-way roller clutch 10 as shown in FIG. 2(II).

With the two-way roller clutch 10 disengaged, when torque is applied to the input shaft 15 and the inner ring 12 is rotated in one direction, the anti-rotation pieces 36 are pressed against either of the bridges 21 of the control retainer 19A and the bridges 23 of the rotary retainer 19B. This causes the control retainer 19A and the rotary retainer 19B to rotate together with the inner ring 12. Since the opposed pairs of rollers 26 are disengaged, i.e. in their neutral positions, in this state, the rotation of the inner ring 12 is not transmitted to the outer ring 11.

When the armature 41 moves toward the rotor 42, and the control retainer 19A moves in the same direction as the armature 41, the bridges 21 and 23 of the control retainer 19A and the rotary retainer 19B press the opposed pairs of rollers 26, thereby disengaging the rollers 26. In this state, the bridges 21 and 23 of the control retainer 19A and the rotary retainer 19B prevent the opposed pairs of rollers 26 from moving into the narrow ends of each wedge space, thus preventing the rollers 26 from getting engaged in error while the two-way roller clutch 10 is idling.

When the control retainer 19A and the rotary retainer 19B rotate relative to each other in the direction to reduce the circumferential width of the pockets 25, the bridges 21 of the control retainer 19A and the bridges 23 of the rotary retainer 19B abut both side edges of the anti-rotation pieces 36 of the spring holder 35, thereby restricting the amount of relative rotation.

This limits the amount of compression of the coil springs 27 to a necessary minimum, thereby preventing breakage of the coil springs 27 due to fatigue even though they are repeatedly compressed and expanded.

When the electromagnetic coil 43a is deenergized while the inner ring 12 is idling, the control retainer 19A is axially moved by the separation spring 44 in the direction in which the flange 20 of the control retainer 19A moves away from the flange 22 of the rotary retainer 19B. This causes the control retainer 19A and the rotary retainer 19B to rotate relative to each other in the direction to increase the circumferential width of the pockets 25 under the biasing force of the coil springs 27. The opposed pairs of rollers 26 are thus instantly wedged into the narrow ends of the wedge spaces, and torque in one direction is transmitted between the inner ring 12 and the outer ring 11 through one of each opposed pair of rollers 26.

In this state, when the input shaft 15 is stopped and then rotated in the opposite direction, the rotation of the inner ring 12 is transmitted to the outer ring 11 through the other of each opposed pair of rollers 26.

Thus, by deenergizing the electromagnetic coil 43a, the control retainer 19A and the rotary retainer 19B rotate relative to each other in the direction to increase the circumferential width of the pockets 25, and the opposed pairs of rollers 26 are instantly wedged into the narrow ends of the wedge spaces. Thus, it is possible to instantly transmit the rotation of the inner ring 12 to the outer ring 11 with a minimum play in the rotational direction.

Since turning torque is transmitted from the inner ring 12 to the outer ring 11 through as many rollers 26 as the cam surfaces 18, it is possible to transmit large torque from the inner ring 12 to the outer ring 11.

The torque cam 30 shown in FIG. 3 comprises the circumferentially opposed pair of protrusions 31 and 32 formed on the opposed surfaces of the flange 20 of the control retainer 19A and the flange 22 of the rotary retainer 19B, respectively, and having the inclined cam surfaces 33 and 34, respectively, that face each other, but the torque cam 30 according to the present invention is not limited thereto.

FIG. 6(I) shows a different torque cam 30, which comprises an opposed pair of cam grooves 52 and 53 formed in the opposed surfaces of the flange 20 of the control retainer 19A and the flange 22 of the rotary retainer 19B, respectively, that are deepest at their circumferentially central portions and gradually shallow toward both ends thereof, and a ball 54 disposed between one end of the cam groove 52 and the other end of the cam groove 53.

The cam grooves 52 and 53 are shown as V-shaped grooves, but may be arcuate grooves.

In this arrangement, when the armature 41 is moved toward the rotor 41 by energization of the electromagnetic coil 43a, and the control retainer 19A is moved in the same direction as the armature 41, as shown in FIG. 6(II), the ball 54 rolls toward the deepest points of the cam grooves 52 and 53, while the control retainer 19A and the rotary retainer 19B rotate relative to each other in the direction to reduce the circumferential width of the pockets 25. Thus, the bridges 21 of the control retainer 19A and the bridges 23 of the rotary retainer 19B press and disengage the opposed pairs of rollers 6 shown in FIG. 3.

When the electromagnetic coil 43a is deenergized, the control retainer 19A is axially moved by the separation spring 44 shown in FIG. 1 in the direction in which the flange 20 of the control retainer 19A moves away from the flange 22 of the rotary retainer 19B. This causes the control retainer 19A and the rotary retainer 19B to rotate relative to each other in the direction to increase the circumferential width of the pockets 25 under the biasing force of the coil springs 27 shown in FIG. 3. The opposed pairs of rollers 26 thus engage the cylindrical surface 17 and the cam surfaces 18 as shown in FIG. 2(I).

With this torque cam 30, since the control retainer 19A and the rotary retainer 19B are rotated relative to each other by the rolling movement of the ball 54 along the cam grooves 52 and 53, compared to the arrangement of FIG. 3, in which the control retainer 19A and the rotary retainer 19B are rotated relative to each other with the inclined cam surfaces 33 and 34 in contact with each other, the control retainer 19A can be moved with less resistance, and the control retainer 19A and the rotary retainer 19B can be more smoothly rotated relative to each other.

Figure 7:
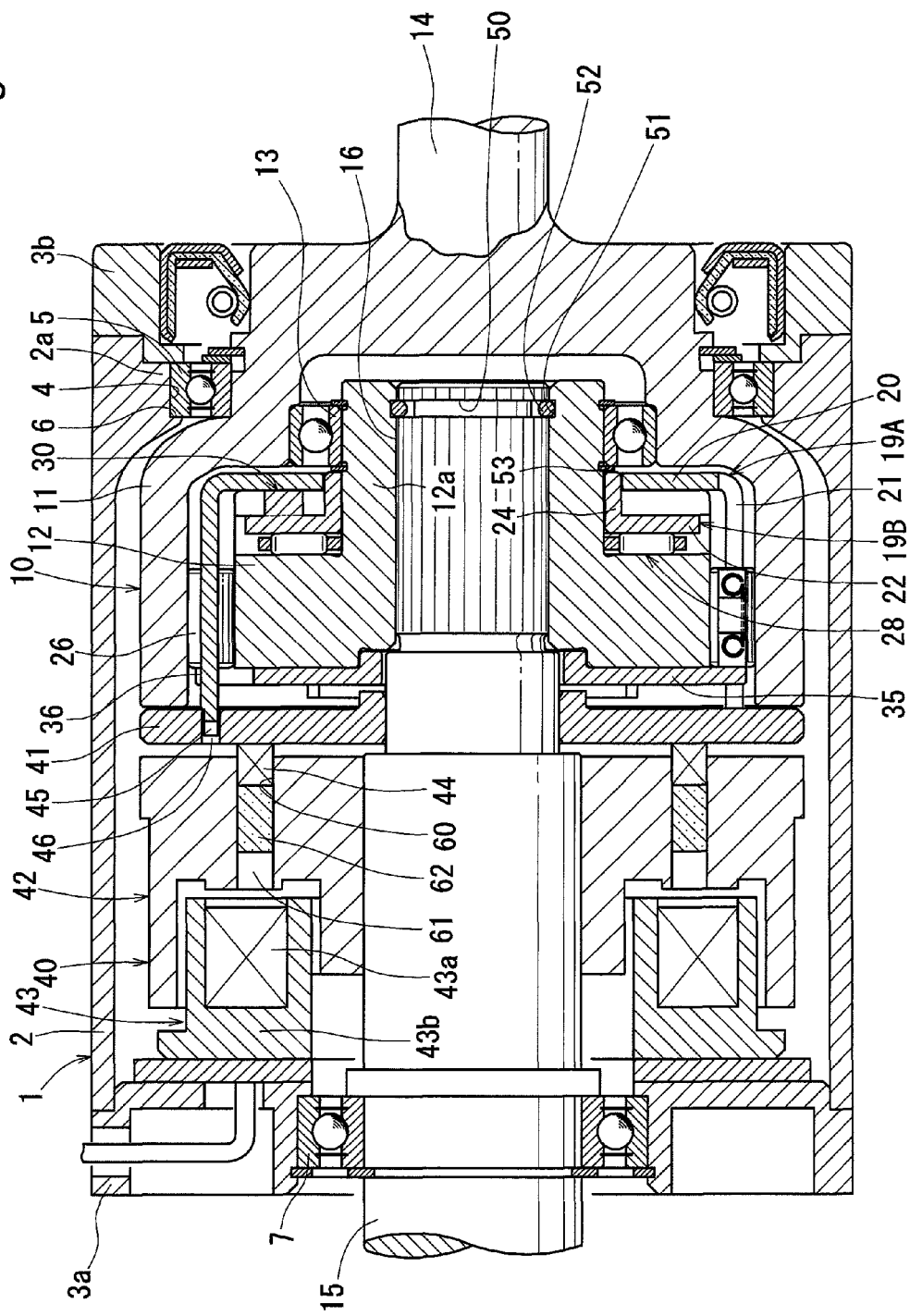
FIG. 7 is a vertical sectional view of a different electromagnetic clutch.

FIG. 7 shows a different electromagnetic clutch 40. This electromagnetic clutch 40 differs from the electromagnetic clutch 40 shown in FIG. 1 only in that an annular groove 60 is formed in the surface of the rotor 42 facing the armature 41, the separation spring 44 is mounted in the annular groove 60, and permanent magnets 62 are mounted in a plurality of arcuate slits 61 formed in the closed end surface of the annular groove 60. Thus, its elements identical to those of the electromagnetic clutch 40 shown in FIG. 1 are denoted by identical numerals and their description is omitted.

With this electromagnetic clutch 40, while the electromagnetic coil 43a of the electromagnet 43 is not energized, the armature 41 is pulled toward the rotor 42 by the magnetic force of the permanent magnets 62. When the electromagnetic coil 43a is energized, the magnetic force of the permanent magnets 62 is weakened, so that the armature 41 is moved away from the rotor by the separation spring 44.

When the armature 41 is moved axially by energizing and deenergizing the electromagnet 43 in the above manner, the control retainer 19A, which is fixedly coupled to the armature 41, is also moved axially. When the control retainer 19A is moved in the direction in which its flange 20 moves toward the flange 22 of the rotary retainer 19B, the control retainer 19A and the rotary retainer 19B rotate relative to each other in the direction to reduce the circumferential width of the pockets 25, due to the action of the torque cam 30. The opposed pairs of rollers 26 are thus pushed by the bridges 21 and 23 of the control retainer 19A and the rotary retainer 19B, and disengage.

When the control retainer 19A is moved in the direction in which the flange 20 of the control retainer 19A moves away from the flange 22 of the rotary retainer 19B, the control retainer 19A and the rotary retainer 19B rotate relative to each other in the direction to increase the circumferential width of the pockets, under the biasing force of the coil springs 27. Thus, the opposed pairs of rollers 26 are instantly wedged into the narrow ends of the wedge spaces.

In FIG. 7, the splines 16, which prevent the inner ring 12 and the input shaft 15 as the torque transmission shaft from rotating relative to each other, may comprise straight spline grooves and straight spline teeth. But in such straight splines 16, gaps in the rotational direction tend to form between the straight spline grooves and the straight spline teeth. Such gaps tend to cause the spline teeth to collide against the side walls of the spline grooves when the rotational direction of the input shaft 15 changes, thus producing noise.

Figure 8:
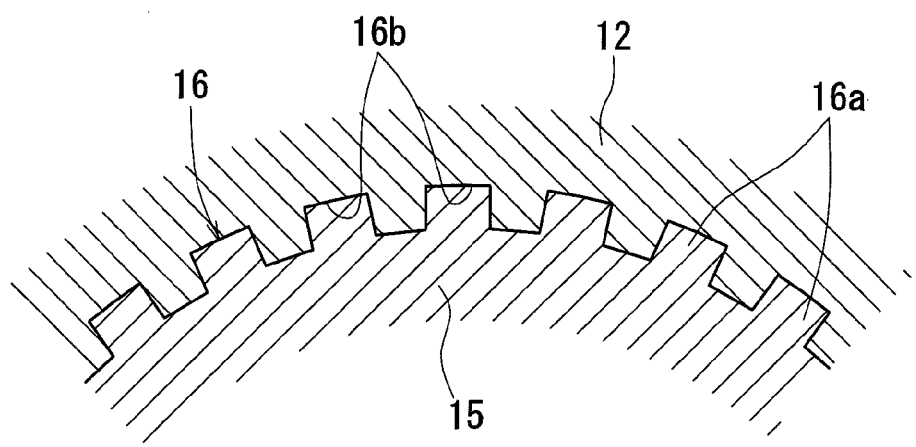
FIG. 8 is a sectional view of a different spline coupling of the inner ring and the input shaft.
Figure 9:
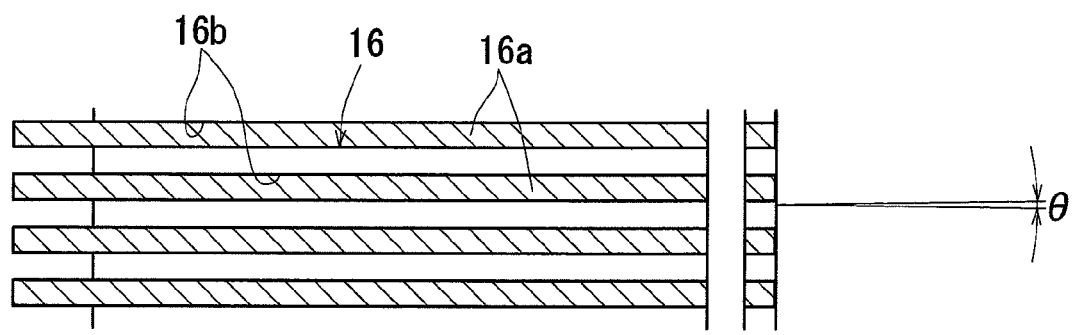
FIG. 9 is a cross-sectional view of FIG. 8.

In order to avoid this problem, in FIGS. 8 and 9, the splines 16 comprise straight spline grooves 16b formed in the radially inner surface of the inner ring 12 to extend parallel to the axis of the inner ring 12, and spline grooves 16a formed on the radially outer surface of the input shaft 15 so as to have a twist angle $\theta$ and press-fitted in the respective spline grooves 16b.

Since such spline teeth 16a, which have a twist angle $\theta$, can be initially loosely fitted in the straight spline grooves 16b, the inner ring 12 can be easily press-fitted onto the input shaft 15. Also, since the spline teeth 16a are press-fitted into the spline grooves 16b, one side wall of each spline tooth 16a is pressed against one side wall of the corresponding spline groove 16b at its leading end with respect to the inserting direction, and its other side wall is pressed against the other side wall of the spline groove 16b at its trailing end. Thus, the input shaft and the inner ring are coupled together without any play in the rotational direction.

Alternatively, the splines 16 may comprise straight spline teeth 16a extending parallel to the axis of the input shaft 15, and spline grooves 16b having such a twist angle θ that the spline teeth 16a can be press-fitted therein. Further alternatively, the spline teeth 16a and the spline grooves 16b may have twist angles that are different from each other.

Figure 10:
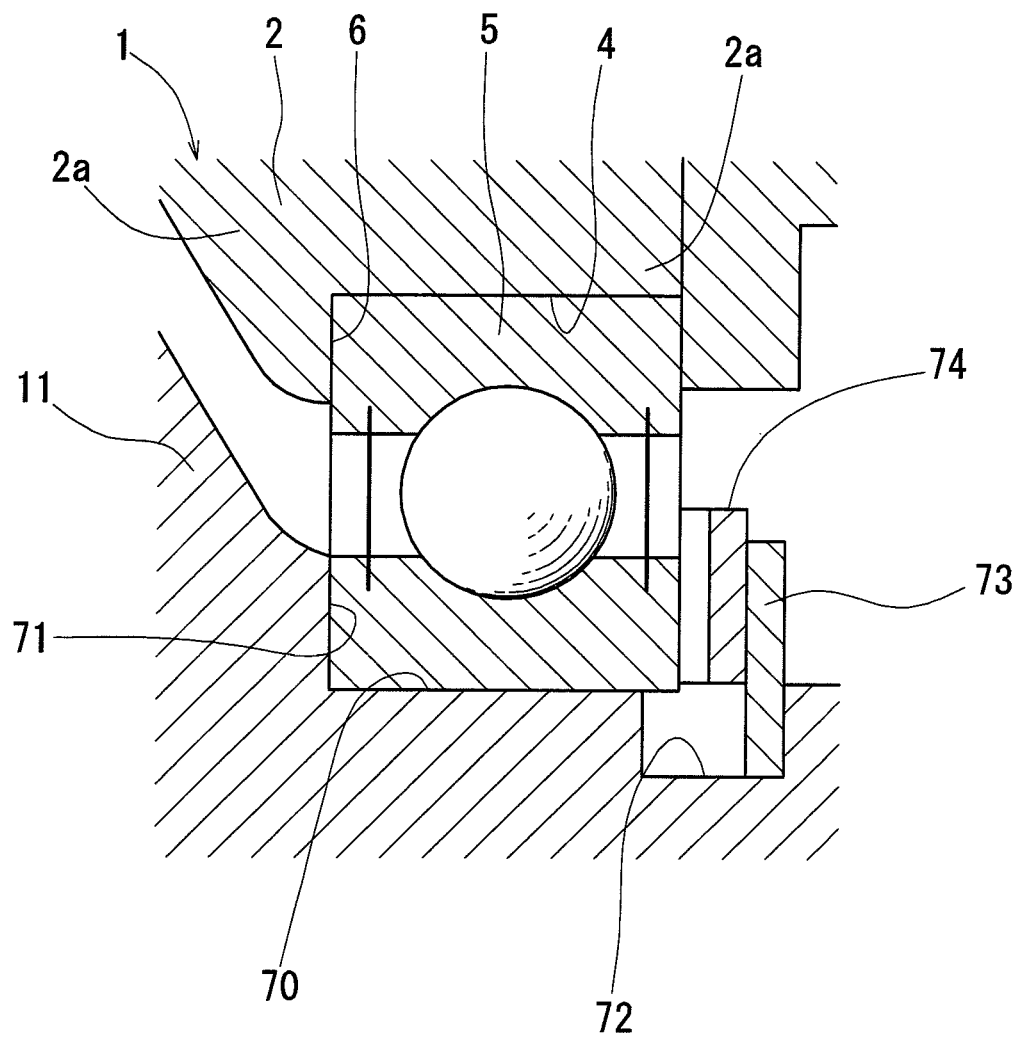
FIG. 10 is a sectional view of an outer ring supporting structure.
Figure 12:
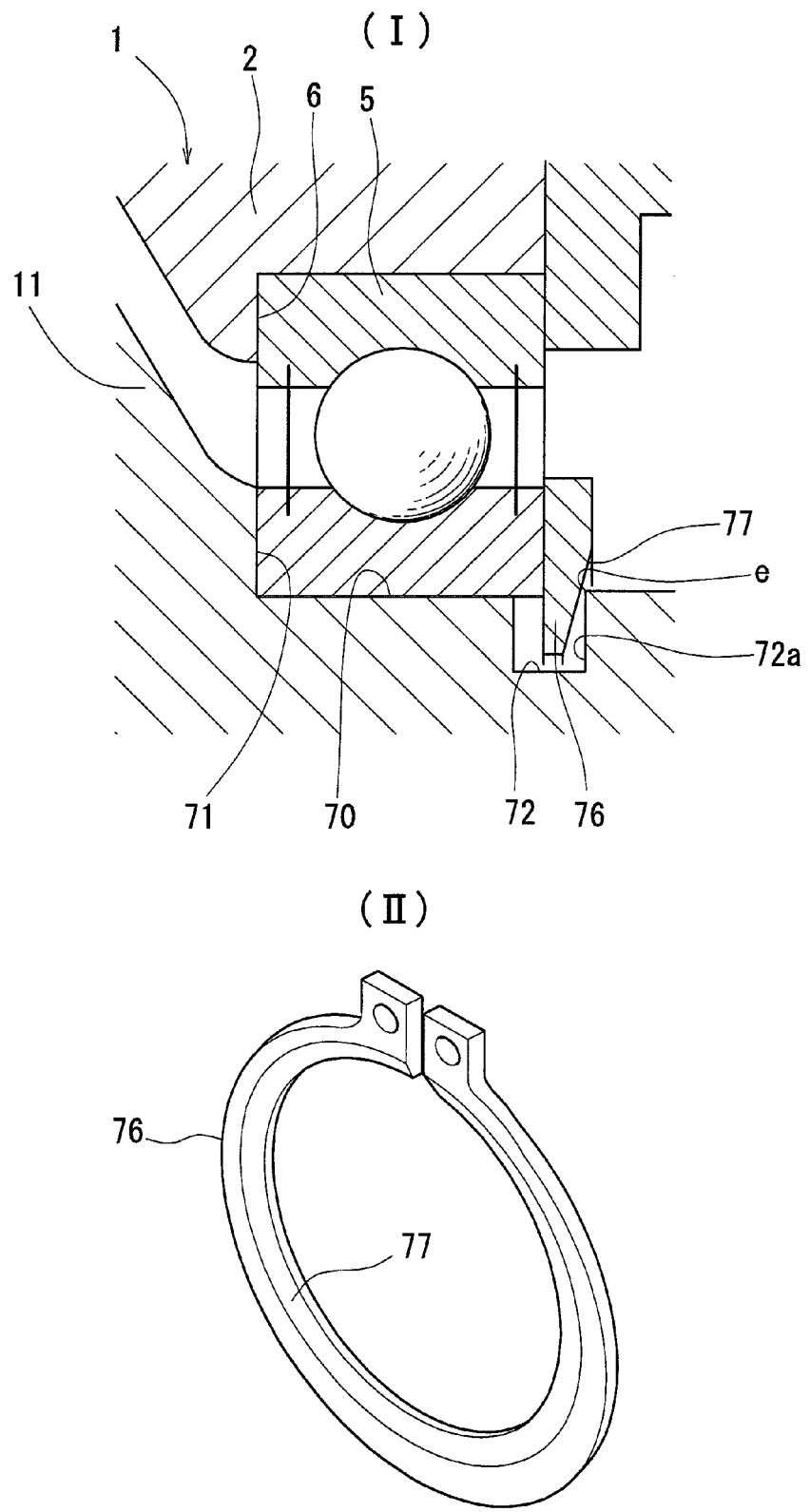
FIG. 12(II) is a perspective view of a snap ring.
Figure 13:
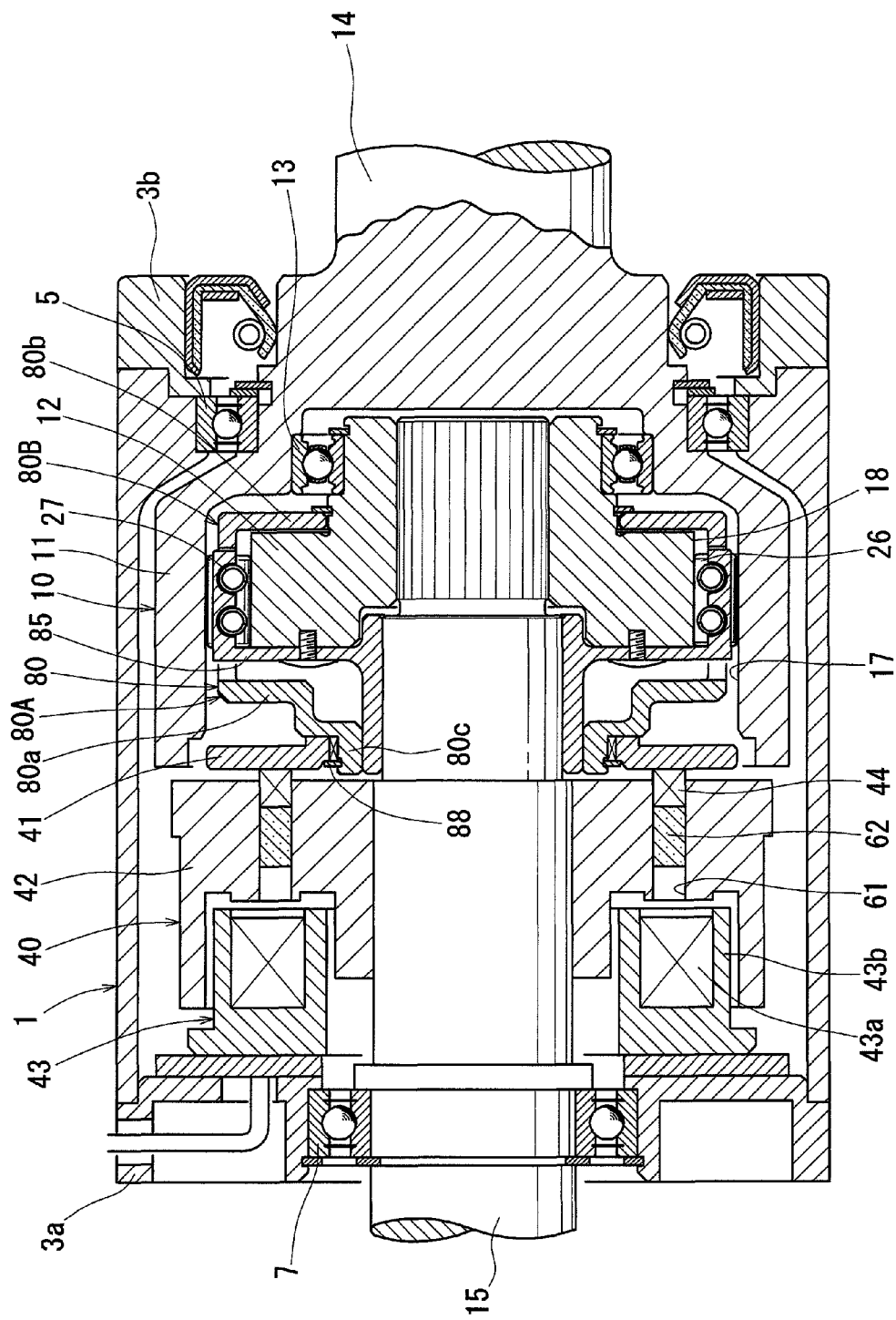
FIG. 13 is a vertical sectional front view of a rotation transmission device according to a second embodiment of the present invention.

FIGS. 10 to 12 shows support structures for rotatably supporting the outer ring 11. In the example of FIG. 10, the outer periphery of the outer ring 11 has a bearing fitting surface 70 fitted in the radially inner surface of the bearing 5 mounted in the housing 1 at one end thereof, and a positioning surface 71 which is brought into abutment with the inner side surface of the bearing 5. An engaging groove 72 is formed in the bearing fitting surface 70 at a position corresponding to the outer side surface of the bearing 5. A snap ring 73 has its radially inner portion engaged in the engaging groove 72, with a wavy washer 74 disposed between the snap ring 73 and the outer side surface of the bearing 5 in an axially compressed state. Thus, the wavy washer 74 biases the outer ring 11 in the direction in which the positioning surface 71 is pressed against the inner side surface of the bearing 5.

In the example shown in FIGS. 11(I) and 11(II), a wavy snap ring 75 is fitted in the engaging groove 72 formed in the bearing fitting surface 70 of the outer ring 11. The wavy snap ring 75 has circumferentially separate ends so as to be radially deformable, and has circumferentially alternating peaks and valleys so as to be axially elastically deformable. The wavy snap ring 75 is fitted in the engaging groove 72 in an axially compressed state, thereby biasing the outer ring 11 in the direction in which the positioning surface 71 is pressed against the inner side surface of the bearing 5.

In the example of FIGS. 12(I) and 12(II), an elastically radially deformable snap ring 76 is fitted in the engaging groove 72 formed in the bearing fitting surface 70 of the outer ring 11 in a radially expanded state such that a tapered surface 77 formed on the outer side surface of the snap ring 76 at its radially inner portion is pressed against the edge e of one side surface 72a of the engaging groove 72. Thus, the snap ring bias the outer ring 11 in the direction to press the positioning surface 71 against the inner side surface of the bearing 5 under the elastic force of the snap ring 76 that tends to radially compress the snap ring 76. In this case, the one side surface of the engaging groove 72 may be a tapered surface tapered in the same direction as the tapered surface 77 of the snap ring 76.

In any of the support structures shown in FIGS. 10 to 12, the outer ring 11 can be mounted so as not to be axially movable.

FIGS. 13 to 17 show the rotation transmission device according to the second embodiment of the present invention. As with the rotation transmission device of FIG. 1, this embodiment includes a two-way roller clutch 10 mounted in a housing 1, and an electromagnetic clutch 40 also mounted in the housing 1 for selectively engaging and disengaging the two-way roller clutch 10.

As with the two-way roller clutch 10 of the first embodiment, the two-way roller clutch 10 of the second embodiment includes a retainer 80 mounted between the cylindrical surface 17 on the inner periphery of an outer ring 11, and the cam surfaces 18 on the outer periphery of the inner ring 12.

The retainer 80 is a cylindrical member having radially inwardly extending flange 80a and 80b at both ends thereof, and formed with pockets 81 facing the respective cam surfaces 18. Mounted in each pocket 81 are an opposed pair of rollers 26 and a plurality of coil springs 27 biasing the pair of rollers 26 away from each other.

Figure 15:
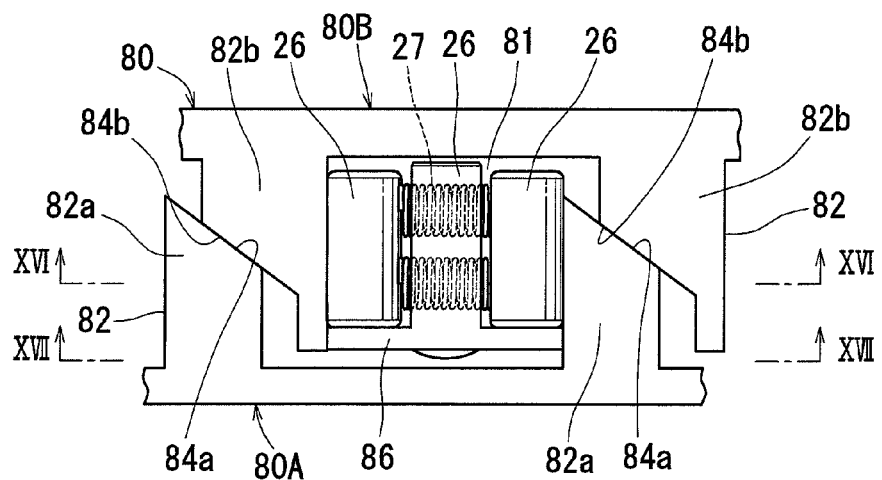
FIG. 15 is a partial plan view of the retainer of the two-way roller clutch shown in FIG. 13.

As shown in FIG. 15, the pockets 81 are defined between adjacent bridges 82 of the retainer 80. Each bridge 82 comprises two separate portions, so that the retainer 80 comprises two separate members including one and the other of the two separate portions of each bridge, respectively, i.e. a control retainer 80A and a rotary retainer 80B.

Figure 14:
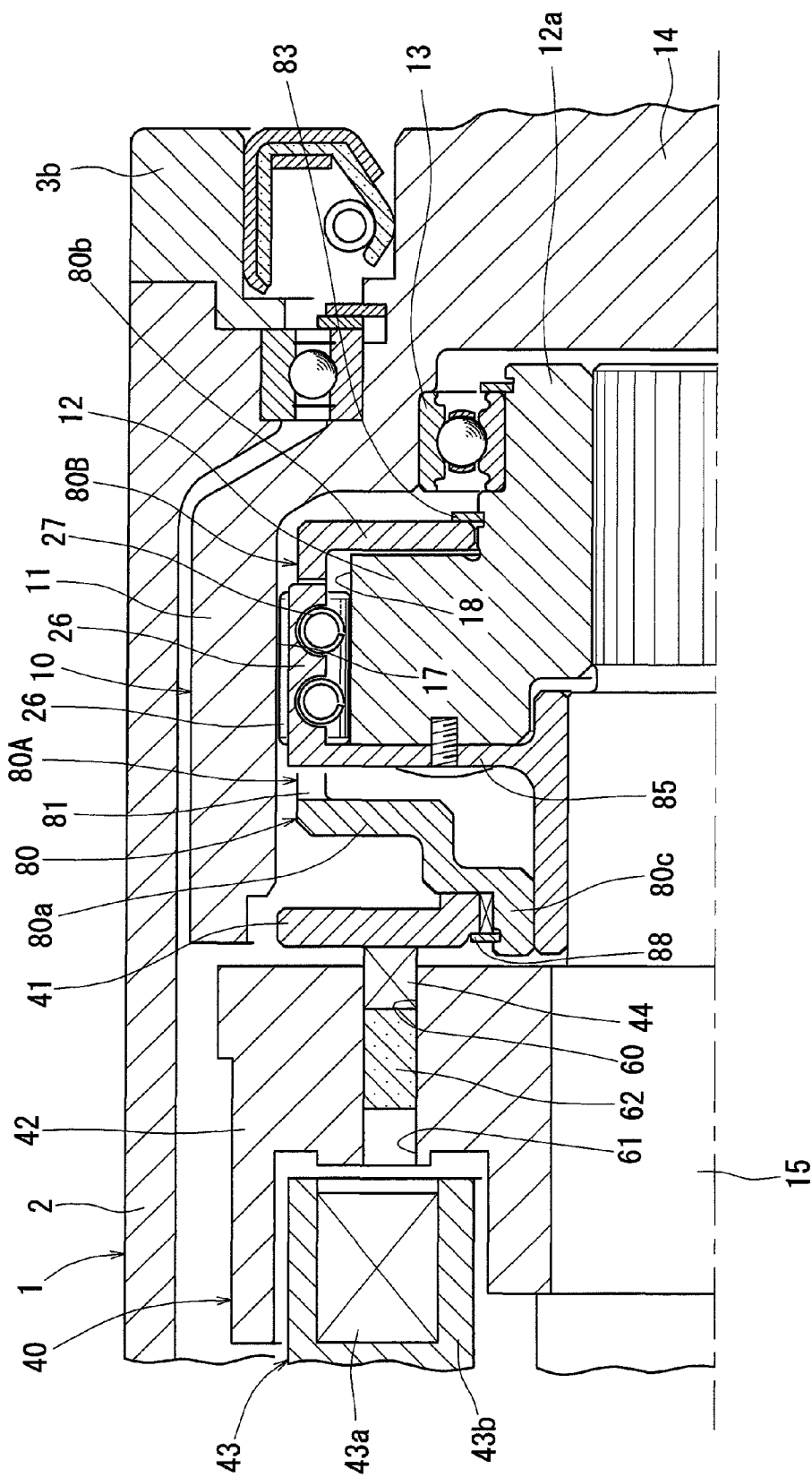
FIG. 14 is a partial enlarged view of FIG. 13.

As shown in FIG. 14, the control retainer 80A includes a cylindrical portion 80c provided at the radially inner edge of the flange 80a and slidably and rotatably supported on the input shaft 15. The rotary retainer 80B is fitted on and rotatably supported by a small-diameter portion 12a formed at the end of the inner ring 12, and prevented from axial movement by a snap ring 83 mounted on the outer periphery of the small-diameter portion 12a and one side surface of the inner ring 12.

As shown in FIG. 15, the bridge portions 82a of the control retainer 80A and the bridge portions 82b of the rotary retainer 80B have tapered cam surfaces 84a and 84b, respectively, that are axially in abutment with each other. Thus, when the control retainer 80A is moved toward the rotary retainer 80B, the control retainer 80A and the rotary retainer 80B rotate relative to each other in the direction to reduce the circumferential width of the pockets 81 due to the camming action between the inclined cam surfaces 84a and 84b.

Figure 16:
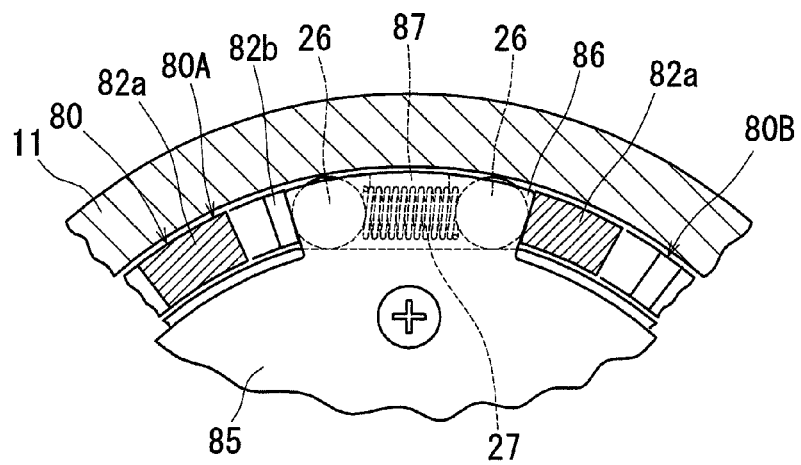
FIG. 16 is a sectional view taken along line XVI-XVI of FIG. 15.

As shown in FIGS. 14 to 16, an annular spring holder 85 is fixed to the other side surface of the inner ring 12, and has a plurality of anti-rotation pieces 86 on its outer periphery which are located in the respective pockets 81 of the retainer 80.

When the control retainer 80A and the rotary retainer 80B rotate relative to each other in the direction in which the circumferential width of the pockets 81 decreases, the anti-rotation pieces 86 support the bridge portions 82a of the control retainer 80A and the bridge portions 82b of the rotary retainer 80B on both side edges thereof, thereby keeping the respective pairs of rollers 26 in their neutral positions.

Each anti-rotation piece 86 carries a support piece 87 extending in the direction transverse to the coil springs 27 for preventing radially outward movement of the coil springs 27.

Otherwise, the two-way roller clutch 10 of this embodiment is structurally identical to the two-way roller clutch 10 shown in FIG. 1. Thus, identical elements are denoted by identical numerals and their description is omitted.

The electromagnetic clutch 40 of this embodiment has an armature 41 as with the electromagnetic clutch 40 shown in FIG. 7. The armature 41 is rotatably fitted on the cylindrical portion 80c formed on the flange 80a of the control retainer 80A and is prevented from axial movement by a snap ring 88 mounted on the outer periphery of the cylindrical portion 80c.

Otherwise, the electromagnetic clutch 40 of this embodiment is structurally identical to the electromagnetic clutch 40 shown in FIG. 7. Thus, identical elements are denoted by identical numerals and their description is omitted.

Now the operation of the rotation transmission device of the second embodiment is described. FIG. 14 shows the state in which the electromagnetic coil 43a of the electromagnet 43 is energized and the armature 41 is separated from the rotor 42 by the separation spring 44. In this state, as shown in FIG. 7, the opposed pairs of rollers 26 of the two-way roller clutch 10 are kept in their neutral positions while being disengaged from the cylindrical surface 17 of the outer ring 11 and the cam surfaces 18 of the inner ring 12, and thus the two-way roller clutch 10 is disengaged.

With the two-way roller clutch 10 disengaged, when torque is applied to the input shaft 15 and the inner ring 12 is rotated in one direction, the anti-rotation pieces 86 formed on the spring holder 85 push the bridge portions 82*a* of the control retainer 80A or the bridge portions 82*b* of the rotary retainer 80B, thereby rotating the control retainer 80A and the rotary retainer 80B together with the inner ring 12. In this state, since the opposed pairs of rollers 26 are in their neutral positions, the rotation of the inner ring 12 is not transmitted to the outer ring 11, and the inner ring 12 idles.

With the inner ring 12 idling, when the electromagnetic coil 43*a* is deenergized, the armature 41 is pulled by the magnetic force of the permanent magnets 62, and moved axially until it is pressed against the rotor 42.

Since the armature 41 is supported by the control retainer 80A so as to be axially immovable relative thereto, when the armature 41 is moved axially in this direction, the control retainer 80A moves away from the rotary retainer 80B.

This produces gaps between the inclined cam surfaces 84*a* of the bridge portions 82*a* of the control retainer 80A and the inclined cam surfaces 84*b* of the bridge portions 82*b* of the rotary retainer 80B. The bridge portions 82*a* of the control retainer 80A and the bridge portions 82*b* of the rotary retainer 80B are pushed by the coil springs 27 through the opposed pairs of rollers 26 in the direction away from each other, so that the control retainer 80A and the rotary retainer 80B rotate relative to each other in the direction to increase the circumferential width of the pockets 81. This causes the opposed pairs of rollers 26 to be instantly wedged into the respective narrow ends of the wedge spaces, so that the rotation of the inner ring 12 is transmitted to the outer ring 11 through one of each opposed pair of rollers 26 and the outer ring 11 rotates in the same direction as the inner ring 12.

When, in this state, the input shaft 15 is stopped and then rotated in the opposite direction, the rotation of the inner ring 12 is transmitted to the outer ring 11 through the other of each opposed pair of rollers 26.

Thus, when the control retainer 80A moves away from the rotary retainer 80B, the control retainer 80A and the rotary retainer 80B rotate relative to each other in the direction to increase the circumferential width of the pockets 81 under the biasing force of the coil springs 27. The opposed pairs of rollers 26 are thus instantly wedged into the narrow ends of the wedge spaces, which allows the torque of the inner ring 12 to be instantly transmitted to the outer ring 11 with minimum play in the rotational direction.

Since torque is transmitted from the inner ring 12 to the outer ring 11 through as many rollers 26 as the cam surfaces 18, large torque can be transmitted from the inner ring 12 to the outer ring 12.

While torque is being transmitted between the outer ring 11 and the inner ring 12, when the electromagnetic coil is energized, the magnetic flux of the permanent magnets 62 that act on the armature 41 decreases, so that the armature 41 moves away from the core 43*b* under the biasing force of the separation spring 44, thus moving the control retainer 80A toward the rotary retainer 80B.

Figure 17:
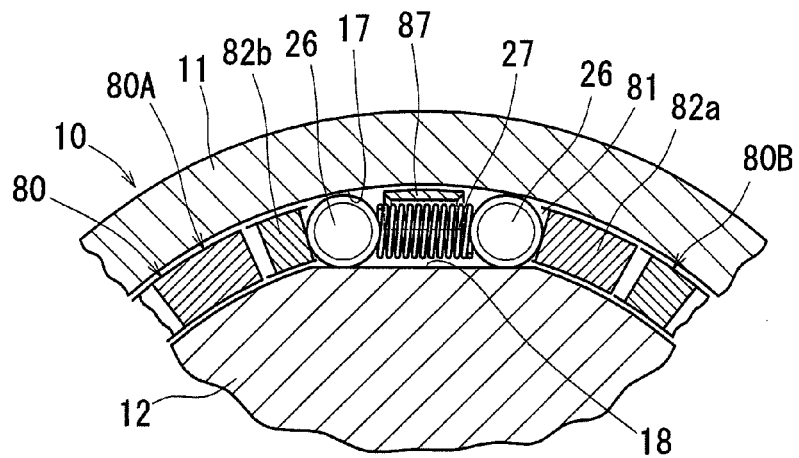
FIG. 17 is a sectional view taken along line XVII-XVII of FIG. 15.

This causes the control retainer 80A and the rotary retainer 80B to rotate relative to each other in the direction to reduce the circumferential width of the pockets 81, due to the camming action between the inclined cam surfaces 84*a* and 84*b* of the bridge portions 82*a* of the control retainer 80A and the bridge portions 82*b* of the rotary retainer 80B, respectively, that are in abutment with each other. Thus, the bridge portions 82*a* of the control retainer 80A and the bridge portions 82*b* of the rotary retainer 80B push and disengage the opposed pairs of rollers 26 as shown in FIG. 17. Thus in this state, the rotation of the inner ring 12 is not transmitted to the outer ring 11 and the inner ring 12 idles.

Thus, when the control retainer 80A moves toward the rotary retainer 80B, the bridge portions 82*a* and 82*b* of the control retainer 80A and the rotary retainer 80B push and disengage the opposed pairs of rollers 26. Thus, in this disengaged state, the bridge portions 82*a* and 82*b* of the control retainer 80A and the rotary retainer 80B prevent the opposed pairs of rollers 26 from being pushed into the narrow ends of the wedge-shaped spaces, which in turn prevents the rollers from getting engaged in error while the two-way roller clutch is idling.

While the inner ring 12 is idling, the coil springs 27 tend to be radially expanded due to centrifugal force that acts on the coil springs 27. But the support pieces 87 provided radially outwardly of the coil springs 27 prevent the coil spring 27 from radially separating from between the opposed pairs of rollers 26.

When the control retainer 80A is moved toward the rotary retainer 80B, thereby rotating the retainers 80A and 80B in the direction to increase the circumferential width of the pockets 81, the bridge portions 82*a* of the control retainer 80A and the bridge portions 82*b* of the rotary retainer 80B abut the side edges of the respective anti-rotation pieces 86 of the spring holder 85, thus restricting the amount of relative rotation between the retainers.

This in turn limits the amount of compression of the coil springs 27 to a necessary minimum, thereby preventing breakage of the coil springs 27 due to fatigue even though they are repeatedly compressed and expanded.

What is claimed is:

1. A rotation transmission device comprising:
   an outer ring having an inner periphery;
   an inner ring mounted inside the outer ring and having an outer periphery, wherein a cylindrical surface is formed on one of the inner periphery of the outer ring and the outer periphery of the inner ring, and a plurality of circumferentially spaced cam surfaces are formed on the other of the inner periphery of the outer ring and the outer periphery of the inner ring to define a wedge-shaped space between the cylindrical surface and each cam surface, each wedge-shaped space narrowing toward circumferential ends thereof;
   a control retainer and a rotary retainer disposed between opposed surfaces of the outer ring and the inner ring, each of said retainers having a flange axially facing the flange of the other retainer, and each of said retainers having bridges provided at the radially outer side of the respective flange and arranged circumferentially alternately with the bridges of the other retainer thereby defining pockets between the adjacent bridges, wherein the control retainer is axially slidably and rotatably supported and the rotary retainer is axially immovably and rotatably supported;
   a torque cam provided between the flanges of the control retainer and the rotary retainer for causing the retainers to rotate relative to each other in a direction to reduce the circumferential width of the pockets when the control retainer is moved in a direction to reduce the distance between the flanges of the respective retainers;
   a plurality of opposed pairs of rollers, each pair being received in one of the pockets;
   coil springs disposed respectively in the pockets, each of the coil springs biasing a pair of the rollers away from each other;

a torque transmission shaft having one end portion thereof inserted in and coupled to the inner ring by a spline; and an electromagnetic clutch mounted on the torque transmission shaft and including an electromagnet having an electromagnetic coil, said electromagnetic clutch being configured to axially move the control retainer when the electromagnetic coil is energized and deenergized.

2. The rotation transmission device of claim 1, wherein the torque cam comprises a pair of protrusions provided on respective opposed surfaces of the flanges of the control retainer and the rotary retainer, each of said protrusions having an inclined cam surface which is opposed to an inclined cam surface of the other protrusion.

3. The rotation transmission device of claim 2, wherein the torque cam comprises a pair of cam grooves formed in respective opposed surfaces of the flanges of the control retainer and the rotary retainer, each of the cam grooves gradually becoming less deep in a direction from a circumferential center thereof toward a circumferential end thereof, and wherein each of said cam grooves has first and second end portions, and a ball disposed between the first end portion of one of the cam grooves and the second end portion of the other of the cam grooves.

4. The rotation transmission device of claim 1, wherein the electromagnetic clutch further comprises an armature coupled to the bridges of the control retainer and slidable in an axial direction of the torque transmission shaft, and a rotor fixed to the torque transmission shaft and axially facing the armature, wherein said electromagnet is supported on a stationary member so as to axially face the rotor, and configured to attract the armature against the rotor when the electromagnet is energized, and wherein the electromagnetic clutch further comprises a separation spring biasing the armature away from the rotor, whereby the armature separates from the rotor when the electromagnet is deenergized.

5. The rotation transmission device of claim 4, wherein the bridges of the control retainer are coupled to the armature by caulking.

6. The rotation transmission device of claim 1, wherein said electromagnetic clutch further comprises an armature coupled to the bridges of the control retainer and slidable in an axial direction of the torque transmission shaft, a rotor fixed to the torque transmission shaft and axially facing the armature, a separation spring biasing the armature away from the rotor, and a permanent magnet attracting the armature toward and against the rotor against a force of the separation spring, and wherein said electromagnet is supported on a stationary member so as to axially face the rotor, and configured to reduce a magnetic force of the permanent magnet lower than the force of the separation spring when the electromagnet is energized.

7. The rotation transmission device of claim 1, wherein said spline comprises a spline groove formed in the inner periphery of the inner ring, and a spline tooth formed on the outer periphery of the torque transmission shaft at said one end portion thereof and engaged in the spline groove, at least one of the spline groove and the spline tooth having a twist angle.

8. The rotation transmission device of claim 1, further comprising:

a disk-shaped spring holder fixed to one side of the inner ring and having an outer periphery; and a plurality of anti-rotation pieces disposed on the outer periphery of the spring holder and adapted to support the respective bridges of the retainers, thereby keeping the opposed pairs of rollers in neutral positions, when the control retainer and the rotary retainer rotate relative to each other in the direction to reduce the circumferential width of the pockets.

9. The rotation transmission device of claim 1, further comprising:

a cylindrical housing in which the outer ring and the electromagnetic clutch are mounted;

a bearing mounted in the housing at one end of the housing; and a biasing member, wherein said outer ring has a bearing fitting surface fitted in a radially inner surface of the bearing, and a positioning surface kept in abutment with an inner side surface of the bearing, thereby axially positioning the outer ring, wherein the biasing member biases the outer ring in a direction in which the positioning surface is pressed against the inner side surface of the bearing, and wherein the electromagnet of the electromagnetic clutch is supported by the housing.

10. The rotation transmission device of claim 1, wherein the pockets defined between the bridges are aligned with the cam surfaces in the circumferential direction.

11. A rotation transmission device comprising:

an outer ring having an inner periphery;

an inner ring mounted inside the outer ring and having an outer periphery, wherein a cylindrical surface is formed on one of the inner periphery of the outer ring and the outer periphery of the inner ring, and a plurality of circumferentially spaced cam surfaces are formed on the other of the inner periphery of the outer ring and the outer periphery of the inner ring to define a wedge-shaped space between the cylindrical surface and each cam surface, each wedge-shaped space narrowing toward circumferential ends thereof;

a cylindrical retainer mounted between the outer ring and the inner ring, the cylindrical retainer comprising a control retainer member and a rotary retainer member, the control retainer member being axially movable and rotatable and the rotary retainer member being axially immovable and rotatable, and the cylindrical retainer having radially inwardly extending flanges at both ends thereof and bridges defining pockets between the adjacent bridges;

a plurality of opposed pairs of rollers, each pair being received in one of the pockets;

coil springs disposed respectively in the pockets, each of the coil springs biasing a pair of the rollers away from each other;

a torque transmission shaft having one end portion thereof inserted in and coupled to the inner ring by a spline; and an electromagnetic clutch mounted on the torque transmission shaft and including an electromagnet having an electromagnetic coil, said electromagnetic clutch being configured to axially move the control retainer member when the electromagnetic coil is energized and deenergized, wherein the bridges of the cylindrical retainer member include a plurality of first bridge portions protruding from the control retainer member and a plurality of second bridge portions protruding from the rotary retainer member, and wherein the first bridge portions have inclined cam surfaces and the second bridge portions have inclined cam surfaces which respectively abut the inclined cam surfaces of the first bridge portion, and the inclined cam surfaces are configured to rotate the control retainer member and the rotary retainer member relative to each other in a direction to reduce the circumferential width of the pockets when the control retainer member moves axially toward the rotary retainer member.

12. The rotation transmission device of claim 10, further comprising:
   an annular spring holder fixed to one side of the inner ring and having an outer periphery; and
   a plurality of anti-rotation pieces disposed on the outer periphery of the spring holder and received in the respective pockets and adapted to support the bridge portions of the control retainer member and the rotary retainer member, thereby keeping the opposed pairs of rollers in neutral positions, when the control retainer and the rotary retainer rotate relative to each other in the direction to reduce the circumferential width of the pockets.

13. The torque transmission device of claim 12, wherein each anti-rotation piece has a support piece extending in a direction transverse to the coil springs to prevent the coil springs from moving radially outwardly.

14. The rotation transmission device of claim 11, wherein the pockets defined between the bridges are aligned with the cam surfaces in the circumferential direction.

* * * * *